July 27, 1954     H. P. LUHN     2,684,718
CARD PUNCHING MACHINE

Filed June 15, 1950     20 Sheets-Sheet 1

INVENTOR
HANS P. LUHN
BY
Charles E. McTiernan
ATTORNEY

July 27, 1954

H. P. LUHN 2,684,718

CARD PUNCHING MACHINE

Filed June 15, 1950

INVENTOR
HANS P. LUHN
BY
Charles E. McTiernan
ATTORNEY

INVENTOR
HANS P LUHN
BY
Charles C. McTiernan
ATTORNEY

July 27, 1954

H. P. LUHN 2,684,718

CARD PUNCHING MACHINE

Filed June 15, 1950

INVENTOR
HANS P LUHN
BY
Charles E. McTiernan
ATTORNEY

July 27, 1954   H. P. LUHN   2,684,718
CARD PUNCHING MACHINE
Filed June 15, 1950   20 Sheets-Sheet 7
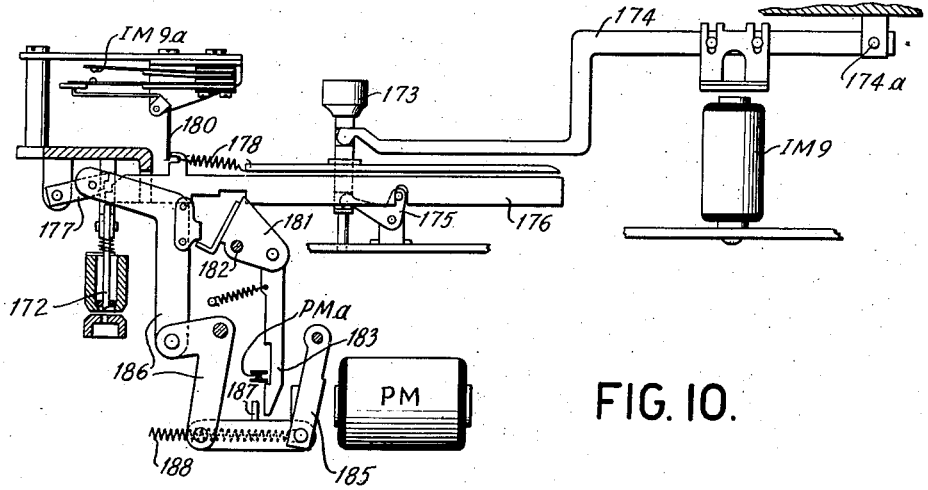
FIG. 10.
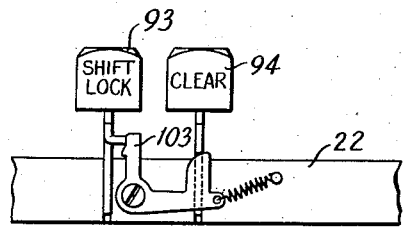
FIG. 9
| KEY CAPTION | FULL WORDING |
|---|---|
| STD | STANDARD |
| TC OPER | TABULAR COMPLEMENTARY OPERATION |
| T OPER | TABULAR NORMAL OPERATION |
| REL | RELEASE |
| COMP | COMPLEMENTARY |
| NORM | NORMAL |
| STA | STACKER |
FIG. 34.
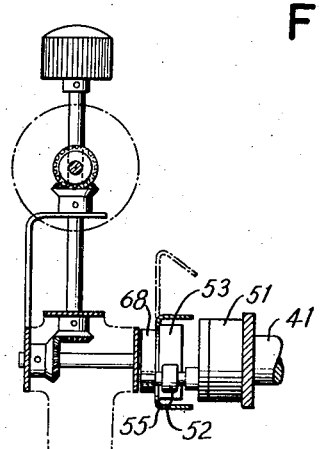
FIG. 11.
INVENTOR
HANS P. LUHN
BY
Charles E. McTiernan
ATTORNEY July 27, 1954  H. P. LUHN  2,684,718
CARD PUNCHING MACHINE Filed June 15, 1950  20 Sheets-Sheet 8

INVENTOR
HANS P LUHN
BY
Charles E. McTiernan
ATTORNEY

July 27, 1954        H. P. LUHN        2,684,718

CARD PUNCHING MACHINE

Filed June 15, 1950        20 Sheets-Sheet 9

FIG. 13.

A1-INDEX SERIES

FIG. 14.

A2-INDEX SERIES

INVENTOR
*HANS P. LUHN*

BY
*Charles E. McTiernan*
ATTORNEY

July 27, 1954  H. P. LUHN  2,684,718
CARD PUNCHING MACHINE
Filed June 15, 1950  20 Sheets-Sheet 10

FIG. 15.

B1 - INDEX SERIES

FIG. 16.

B2 - INDEX SERIES

INVENTOR
HANS P LUHN
BY
Charles E. McTiernan
ATTORNEY

July 27, 1954  H. P. LUHN  2,684,718
CARD PUNCHING MACHINE
Filed June 15, 1950  20 Sheets-Sheet 11

INVENTOR
HANS P LUHN
BY
Charles C. McTiernan
ATTORNEY

July 27, 1954  H. P. LUHN  2,684,718
CARD PUNCHING MACHINE
Filed June 15, 1950  20 Sheets-Sheet 12

D1-MAJOR SERIES
(accompanied by X or Y)

FIG. 20.

D2-MAJOR SERIES
(accompanied by X or Y)

subscript  superscript

FIG. 21.

INVENTOR
*HANS P. LUHN*

BY
*Charles E. McTiernan*
ATTORNEY

July 27, 1954     H. P. LUHN     2,684,718
CARD PUNCHING MACHINE

Filed June 15, 1950     20 Sheets-Sheet 13

INVENTOR
*HANS P. LUHN*

BY
*Charles E. McTiernan*
ATTORNEY

July 27, 1954  H. P. LUHN  2,684,718
CARD PUNCHING MACHINE
Filed June 15, 1950  20 Sheets-Sheet 14

← DIRECTION OF MOVING DETAIL CARDS

INVENTOR.
HANS P. LUHN
BY
Charles C. McTiernan
ATTORNEY

July 27, 1954        H. P. LUHN        2,684,718
CARD PUNCHING MACHINE
Filed June 15, 1950        20 Sheets-Sheet 15

FIG. 28.

|  | Index Series | | | | Major Series | | | | | Minor Series | | | |
|---|---|---|---|---|---|---|---|---|---|---|---|---|---|
|  | A1 | A2 | B1 | B2 | C1 | C2 | D1 | D2 | E | F1 | F2 | G1 | G2 |
| DECK U |  |  |  |  |  |  | 1 |  |  |  | 2 |  |  |
| DECK I | 0-1 | 5-4 | 3 | 2 | 4 | 0 | 1 | 3 | 2 | 0 | 3 | 2 | 1 |
| DECK L | 5-4 | 0-1 | 2 | 3 | 0 | 4 | 3 | 1 | 2 | 3 | 0 | 1 | 2 |
| Possible Combinations | 26 | 26 | 100 | 100 | 5 | 5 | 50 | 50 | 100 | 10 | 10 | 50 | 50 |

252          210×2=420          120

Total Combinations = 792

INVENTOR
HANS P. LUHN
BY
Charles C. Mc Tiernan
ATTORNEY

July 27, 1954     H. P. LUHN     2,684,718
CARD PUNCHING MACHINE
Filed June 15, 1950     20 Sheets-Sheet 16

FIG. 29.

| | Geographical Location of Branch Offices-Table 97* | | | | |
|---|---|---|---|---|---|
| 0 | Alabama | Idaho | Michigan | New York | Tenn. |
| 1 | Arizona | Illinois | Minnesota | No. Carolina | Texas |
| 2 | Arkansas | Indiana | Mississippi | No. Dakota | Utah |
| 3 | California | Iowa | Missouri | Ohio | Vermont |
| 4 | Colorado | Kansas | Montana | Oklahoma | Virginia |
| 5 | Connecticut | Kentucky | Nebraska | Oregon | Washington |
| 6 | Delaware | Louisiana | Nevada | Penn. | West Va. |
| 7 | District of Col. | Maine | New Hampshire | Rhode Island | Wisconsin |
| 8 | Florida | Maryland | New Jersey | So. Carolina | Wyoming |
| 9 | Georgia | Massachusetts | New Mexico | So. Dakota | Hawaii |
| | Col. #1 | Col. #2 | Col. #3 | Col. #4 | Col. #5 |

FIG. 30.

INVENTOR.
HANS P. LUHN
BY
Charles E. McTiernan
ATTORNEY

July 27, 1954    H. P. LUHN    2,684,718
CARD PUNCHING MACHINE
Filed June 15, 1950    20 Sheets-Sheet 17

INVENTOR.
HANS P. LUHN
BY
Charles E. McTiernan
ATTORNEY

July 27, 1954

H. P. LUHN 2,684,718

CARD PUNCHING MACHINE

Filed June 15, 1950

INVENTOR
HANS P. LUHN
BY
Charles E. McTiernan
ATTORNEY

Patented July 27, 1954

2,684,718

UNITED STATES PATENT OFFICE 2,684,718

CARD PUNCHING MACHINE

Hans P. Luhn, Armonk, N. Y., assignor to International Business Machines Corporation, New York, N. Y., a corporation of New York Application June 15, 1950, Serial No. 168,199

12 Claims. (Cl. 164—113)

The present invention relates generally to perforating apparatus and more specifically to a manually operable keyboard for controlling the operations of the perforating apparatus.

The keyboard described and claimed herein is adapted to be employed with the perforating apparatus per se of the type such as shown in Patent 2,424,097, granted July 15, 1947, to R. B. Johnson. The keyboard is adapted to be used mainly for actuating perforating apparatus for the punching of a new and novel coding system within a record card. The coding arrangement comprises a fixed number of holes, these being five in number, divided among three decks of a record card in various combinations where the various combinations representing alphabetical and numerical characters are distributed among three distinguishable coding series which are further broken down into a plurality of sub-series.

The keyboard contains a first set of keys, identified as the intermediately placed set of keys in Fig. 1, each having an alphabetical and numerical marking, which upon being depressed engages an associated permutating key lever which is adapted to actuate one or more movable members causing the resulting energization of a corresponding number of interposer magnets. The keyboard also contains a set of code series selecting keys, identified as the keys in the top line of keys in Fig. 1, which set up the keyboard for a conditioning operation of the perforating apparatus for the characters represented by the selected code. The code selecting keys upon being depressed, slidably position movable members so as to be actuated by the proper character bearing key. The positioning of the movable members is such that, depending upon the code selector key depressed, it is possible for the same character key to condition the perforating apparatus for a numerical punching operation or for an alphabetical punching operation.

The principal object of the invention is to provide a keyboard to control the punching of the fixed number of perforations within a single column.

Another object of the invention is to provide a keyboard having a plurality of character keys and a group of code selector keys where said selector keys control the operation of said character keys.

A further object of the invention is to provide a keyboard having a set of keys each bearing a letter and numerical indicia, see Fig. 12, and a second set of keys for enabling said first set of keys to condition perforating apparatus for either a letter or a numerical punching operation.

A still further object of the invention is to provide a keyboard having a first set of keys and a set of keyboard conditioning keys where said keyboard conditioning keys determine the operations to be effected by said first set of keys.

A still further object of the invention resides in the provision of a conditioning circuit which will permit the energization of a punch selecting means only if a fixed number of interposer magnets are energized.

Another object of the invention is to provide, in a modified action, a keyboard arrangement for selectively conditioning perforating apparatus for the punching of either five, six, seven, or any number of holes within a single column of a record card.

Another object of the invention is to provide a keyboard having means for indicating the row or rows of the intermediately placed set of keys to be depressed in order to represent a particular coding arrangement within a record card.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 9 is a sectional view taken along the lines 9—9 of Fig. 1 and showing the shift lock locking arrangement.

Fig. 10 is a view showing the relationship existing between the interposer magnet and the punch magnet.

Fig. 11 is a fragmentary view showing the gear arrangement for driving the indicating drum.

Fig. 12 is a diagrammatic view showing the relationship between the markings on the indicating drum and the keys of the keyboard.

Fig. 12a is a diagrammatic view showing the disposition of the projections on the drive shaft.

Figs. 13 to 25 represent the several series and subseries grouping of a new and novel coding arrangement.

Fig. 28 is a chart summarizing the several groupings.

Figs. 29 to 32 represent a modification of the coding arrangement and is directed towards the form of tabular notations.

Figure 33A:
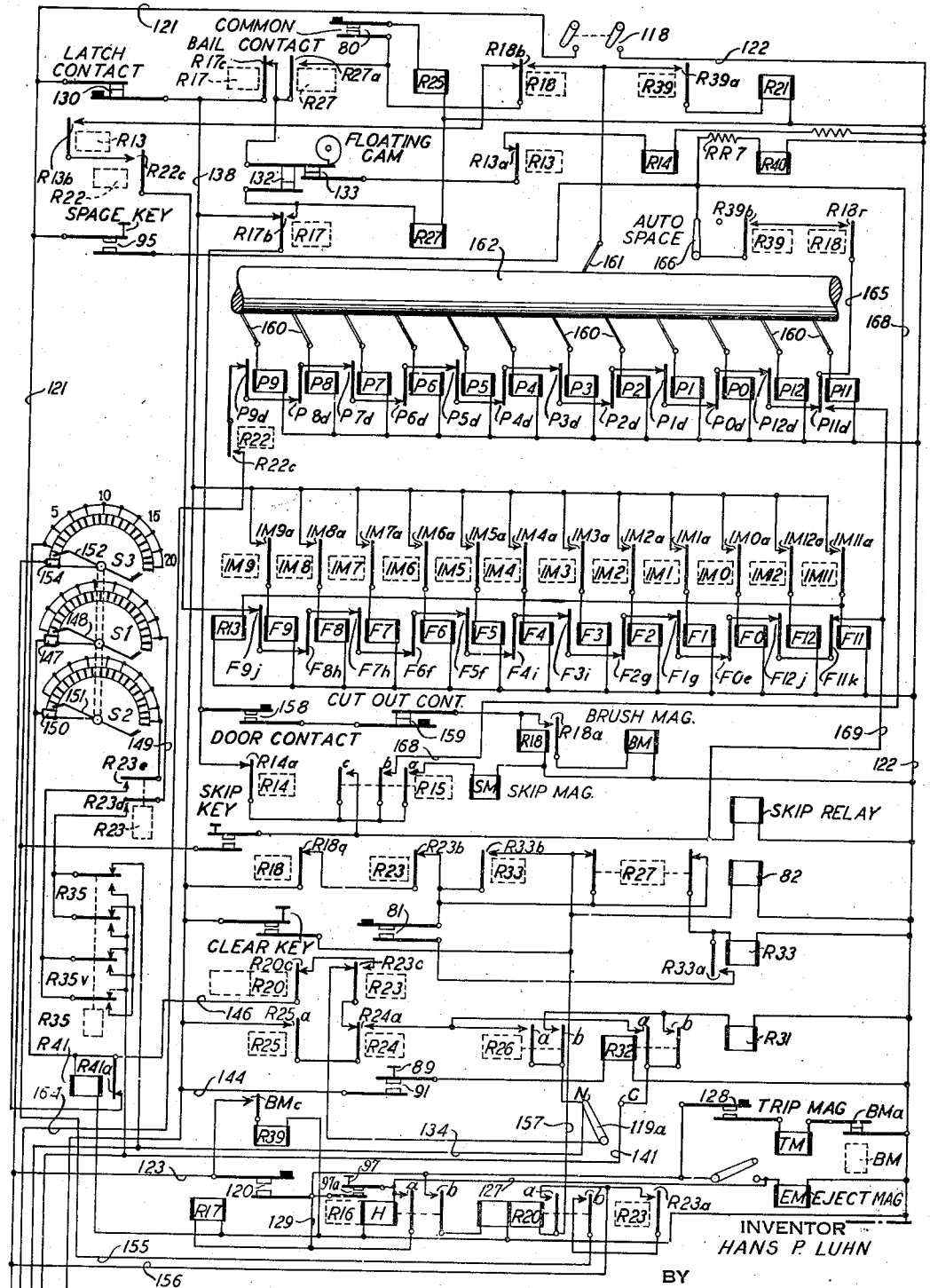

Figs. 33a, b and c taken together vertically with Fig. 33a at the top comprises the wiring diagram for the keyboard.

Figure 1:
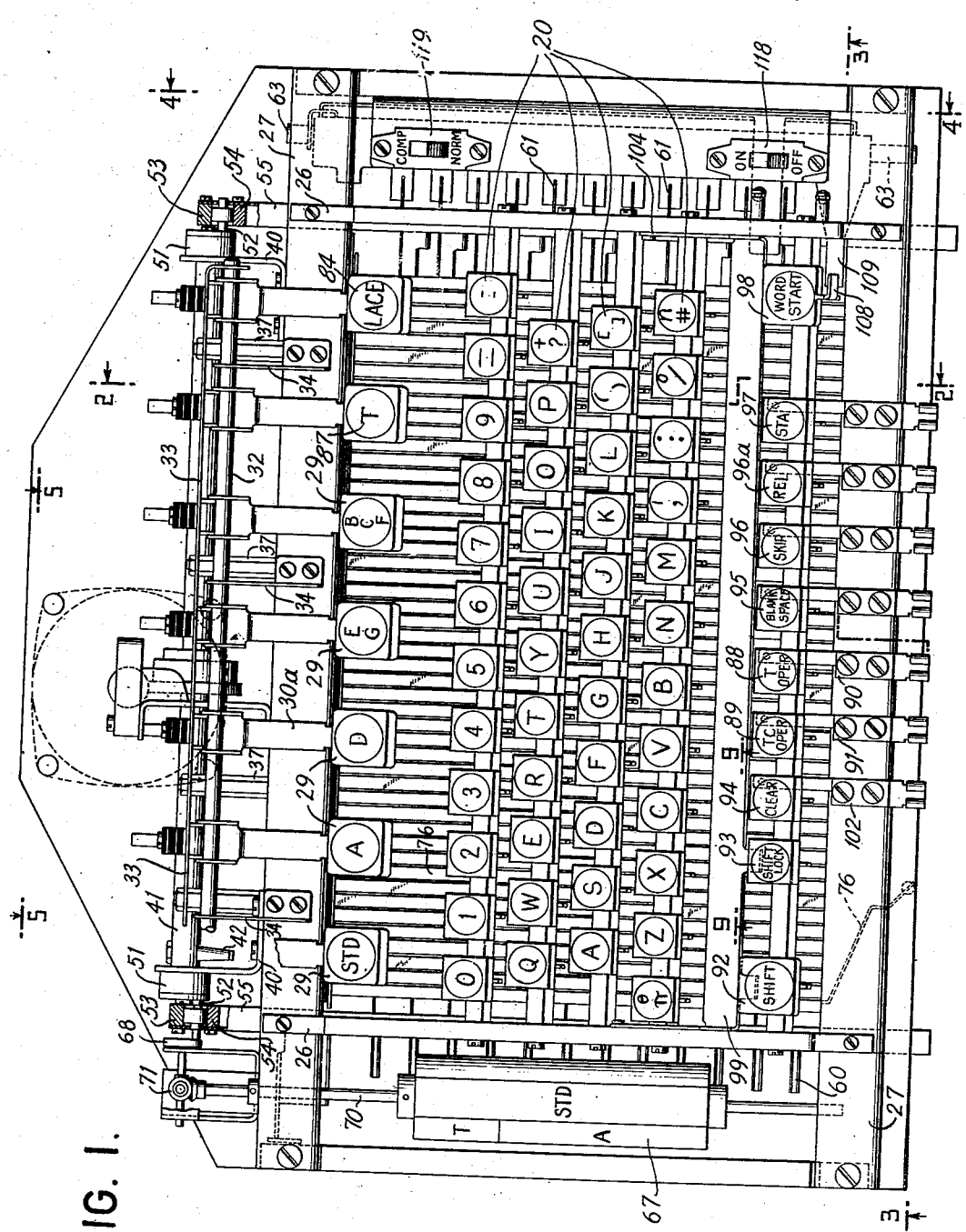
Fig. 1 is a plan view partly cut away of the keyboard.

Fig. 34 is a chart showing the full wording for the abbreviated captions which are stamped on the keys of the keyboard as shown in Fig. 1.

The record card

In order that the invention described herein may be fully appreciated and understood a description of the novel coding arrangement employed therewith will first be described.

The record card is shown and described in copending application Serial No. 153,197 of Hans P. Luhn, filed March 31, 1950, wherein the novel features thereof are claimed.

Figure 26:
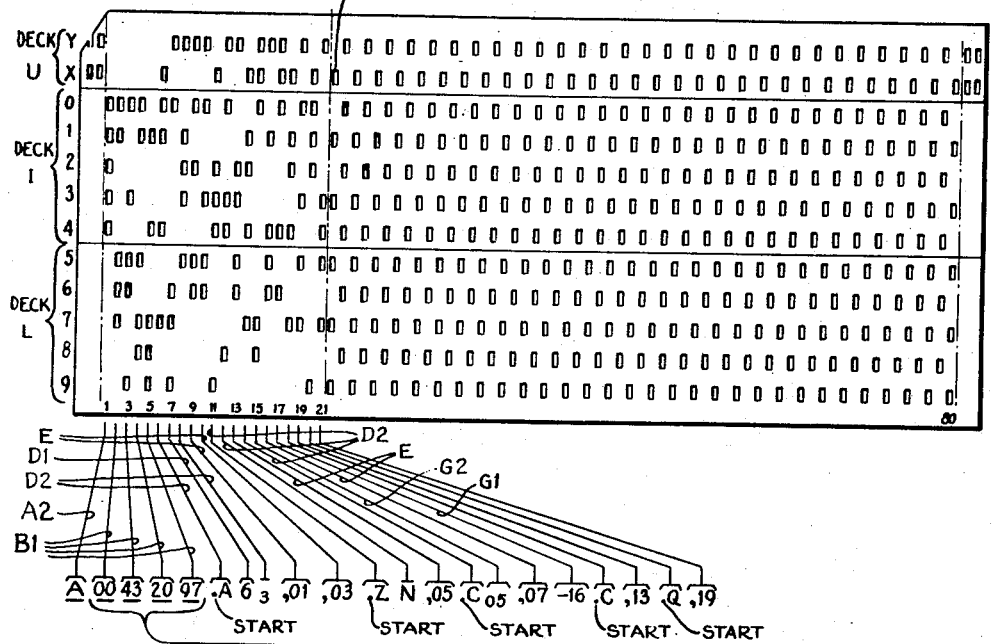
Fig. 26 is a detail card showing perforations in accordance with the new coding arrangement.

The record card in which statistical or other reference data are to be recorded, in accordance with the present invention, takes the form of the well known IBM machine controlling record card, which is provided as shown in Fig. 26 with the usual 80 vertical columns of punching or recording positions, each of which columns contains twelve so-called index point positions designated Y, X, 0, 1, 2, 3, 4, 5, 6, 7, 8, 9. For purposes of the present invention, the card is subdivided into three so-called decks, of which the upper deck U includes the Y and X positions, the intermediate deck I includes the 0 to 4 positions, and the lower deck L includes the remaining positions 5 to 9.

Data are recorded in the card columns by utilization of a code in which combinations of five holes distributed among the twelve possible recording positions in each column are grouped, to provide an arrangement that is more suitable for interpretation, and will enable the recording of more data in a given length of record card, i. e., a given number of card columns, than has heretofore been accomplished. This is effected by distributing the 792 possible five hole combinations in what may be designated as index, major and minor series, which are broadly distinguishable in that the index series contains no perforations in deck U; the major series contains a perforation in either the X or Y position in deck U; and the minor series has perforations in both the X and Y positions of deck U.

Index series

The several five hole combinations included in the index series are represented in Figs. 13, 14, 15 and 16 from which, it will be noted, that this series is subdivided into what may be termed subseries A1, A2, B1 and B2.

*Index series A1.*—Referring particularly to Fig. 13, this subseries comprises five-hole combinations wherein four holes are grouped in deck L and the fifth hole lies in deck I, and also the special case where all five holes or designations lie in deck L. These different combinations of which there are twenty-six may have assigned to them designations such as indicated along the top edge of the record to identify them as, for example, lower case letters as further distinguished by an underscoring mark.

It will be noted that in this subseries the hole arrangement in the lower deck L with the exception of the arrangement of all five holes being in the L deck repeats for each successive group of five letters, and that the location of the hole in deck I will identify to which section of the alphabet the lower group relates.

It is to be noted that in Fig. 13 and other coding diagrams that the recording columns are spaced apart a greater distance than they would occur on the record card. This is done to enable easier identification of the combinations occurring in the various columns.

*Index series A2.*—In Fig. 14 are grouped all the five hole combinations wherein five or four of the positions occur in the intermediate deck I and the remaining designation occurs in deck L. This provides a group of 26 different characters to which may be assigned another set of characters as indicated along the upper edge of the record, and may relate to upper case letters of the alphabet accompanied by an underscoring mark.

A comparison of the coding in Figs. 13 and 14 will show the facility with which a designated character may be identified in the present arrangement. Taking any of the combinations illustrated, the absence of perforations in deck U, identifies it as being in the index series, the grouping of either four or five holes in a single one of the decks identifies it as an alphabetic character. The location of these four or five holes in deck I would identify it as an upper case letter, while if the four or five holes occur in deck L it would be identified as a lower case letter.

It is to be particularly noted that the distinction between the subseries A1 and A2 lies in the fact that there is a transposition of decks, i. e. deck L of Fig. 13 is the same as deck I in Fig. 14, and similarly deck I of Fig. 13 is the same as deck L of Fig. 14.

*Index series B1.*—In Fig. 15 it is shown how all the combinations, wherein three holes lie in deck L and two holes lie in deck I, are utilized to represent a hundred different things which for convenience are identified along the top edge of the record as 2-place numerals accompanied by an underscoring mark. In addition thereto, the two numerals are represented in a single column as a 2-place number with the tens digit identified by the three hole combination in deck L and the units digit by the 2 hole combination deck I. This arrangement might be termed a combination within a combination in that the units digits within deck I are represented in the form of a two hole combination, that is, by perforations in various pairs of the possible five positions in this deck, while in deck L the tens digit are represented by perforations in three of the possible five hole locations.

*Index series B2.*—This series (Fig. 16) provides a further arrangement utilizing all the five hole combinations numbering 100, in which three of the five designations occur in deck I while the remaining two occur in deck L. Each combinational arrangement is identifiable as a 2-place number followed by the number sign #, the three hole combinations in deck I identify the tens digit of the 2-place numbers, while the two hole combination in deck L identify the units digit.

Comparison between Figs. 15 and 16 shows the identity of deck L in Fig. 15 with deck I in Fig. 16 and also the identity between deck I in Fig. 15 and deck L in Fig. 16.

Considering the four subseries of this index series, its distinctive characteristics may be summarized as follows:

(1) Absence of perforations in deck U identify it as the index series.

(2) A group of four or five holes in either of the two lower fields identify it as an alphabetic series A1 or A2.

(3) The location of the four hole group identify it as a lower case series A1 if occuring in deck L and as an upper case series A2 if occurring in deck I.

(4) The grouping of the perforations with three in either of the two lower decks will identify the subseries as B1 or B2 and the three hole grouping will identify the tens digit of the 2-place number in both cases.

(5) If the tens digit is in the lower deck L, it identifies the series B1 and if the tens digit occurs in deck I it identifies the series as B2.

It is to be particularly noted that the B1 and B2 series provide for recording two digits in a single column with each digit in a predetermined deck and with the units and tens digits distinguishable by their separate subcombinational characteristics within their related decks.

Referring to Fig. 26 in which a record card is shown with perforations in accordance with the coding described, inspection will show that columns 1 to 5 contain perforations made in accordance with the index series to represent A 00 43 20 97. Inspection will show that the letter A is identifiable as belonging to the A2 series and all the digits are related to the B1 series in accordance with the rules of identification set forth hereinabove.

*Major series*

Figs. 17, 18, 19, 20 and 21 illustrate the groupings of those five hole combinations that include a single hole in either the X or Y positions of deck U. The presence of an X hole identifies the character as one constituting the beginning of a word, term or expression, that is the beginning of a series of characters that are to be taken together to represent some value or quantity. The presence of a Y hole indicates that the combination represents the character within the word, term or expression. This may be made more clear after the coding arrangement for this series has been explained in detail.

*Major series E.*—This series (Fig. 17) comprises those five hole combinations in which one hole occurs in the deck U and two each in decks I and L. There are 100 such combinations including the X hole and another hundred including the Y hole, and in each set the designations are represented as 2-place numbers prefixed by a comma. The only difference is that, where the X index position is perforated, the combination represents the 2-place number and also represents that it is the first character of a word, term or expression. In the combination where the Y hole occurs, it represents a 2-place number and also that it is a part of the word, term or expression other than the first character or symbol thereof. In this series also the two digits of the number represented in any column comprise the units digit in deck I and the tens digit in deck L. The units digit is represented by a two hole combination within the five positions of deck I and the tens digit is represented by the identical two hole combination within the five holes of deck L, so that the tens digit is identified by its location in the lower deck and therein differs from the identification of the tens digit in the index series B1 and B2, where the tens digit is identified by virtue of its representation as a three hole combination in one of the lower decks.

*Major series C1.*—In this series (Fig. 18) are included all the five hole combinations of which one hole occurs in deck U and the remaining four in deck I. Such combinations are identified as underscored numerals for superscript purposes.

*Major series C2.*—In this series (Fig. 19) are included all the five hole combinations, of which one hole occurs in deck U and the remaining four in deck L. Such combinations are identified as underscored numerals 5 to 9 for superscript purposes.

*Major series D1.*—In this series are grouped all the five hole combinations, wherein one hole occurs in each of the two upper decks and the remaining three occur in the lowermost deck L, and to each different combination there is assigned a character or symbol as indicated in Fig. 20 which includes numerals, lower case letters and the more common symbols occurring on the keys of well-known typewriters.

*Major series D2.*—Referring to Fig. 21, in this grouping are all the five hole combinations in which one hole occurs in deck U, one hole in deck L and the remaining three in deck I. This arrangement is the same as that of Fig. 20 with transposition of the decks I and L and with characters allocated to the different combinations as shown along the top margin of the record of Fig. 21.

Briefly reviewing the coding arrangement for this major series, its identity is determined as mentioned hereinabove by the presence of a hole in the X or Y position. The subseries C1 and C2 are readily identifiable by the four hole arrangement within decks I and L, respectively; the E series is identifiable by the split-up of the remaining four holes with two in each of the lower decks, and the D1 and D2 series are identifiable respectively by the presence of three-hole combinations in the lower and intermediate decks, respectively.

Referring to the record card (Fig. 26), the example shown therein indicates in column 6 of the card an X perforation identifying this as a start of a word or expression and constituting part of the five hole combination representing the upper case letter A. The designations in columns 7, 8, 9 and 10 of the card indicate that these characters are part of the expression beginning with the character identified in column 6 of the card, and examination will show that perforations in column 7 represent the numeral 6 of the subseries D1, the perforations in column 8 represent the subscript 3 from the subseries D2, the perforations in column 9 represent the identification ,01 from series E, and the perforations in column 10 represent the character ,03 also in the E series. In column 11 the combination again occurs with the X hole, indicating that this is the first character of another term or expression, and the combination corresponds to the character Z from series D2.

Column 12 has the Y hole indicating the continuity of the expression, and the 5-hole combination in this column represents the letter N also from the series D2.

Minor series

This series is identifiable as such by the presence of a hole or designation in both of the index point positions X and Y of the upper deck U, and this series is broken down into the four subseries designated F1, F2, G1, G2 whose combination arrangements are shown in Figs. 22 to 25.

Figure 22:
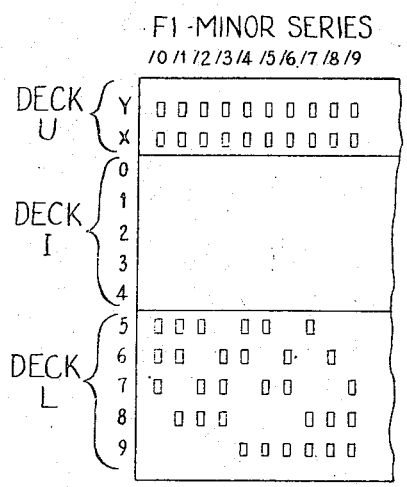
Figure 23:
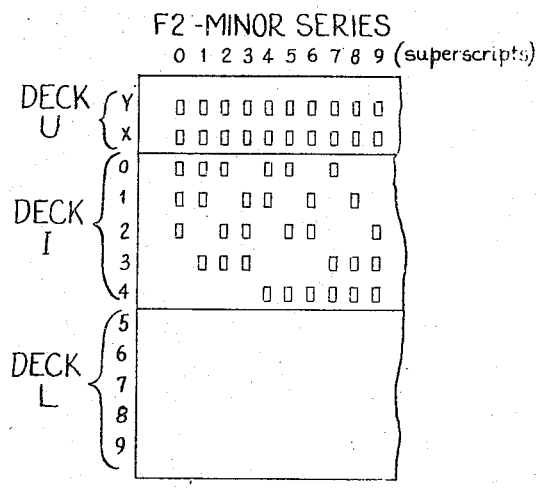
Figure 24:
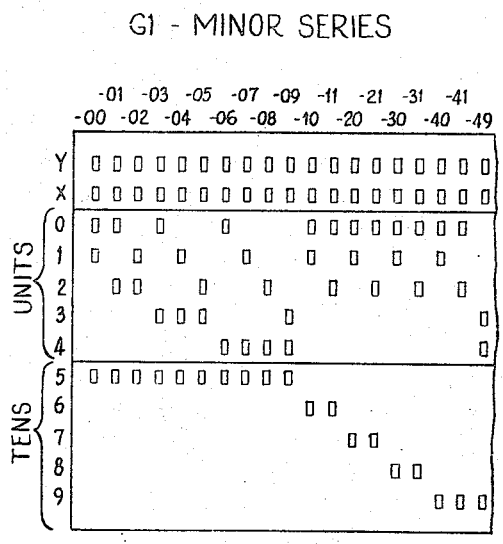
Figure 25:
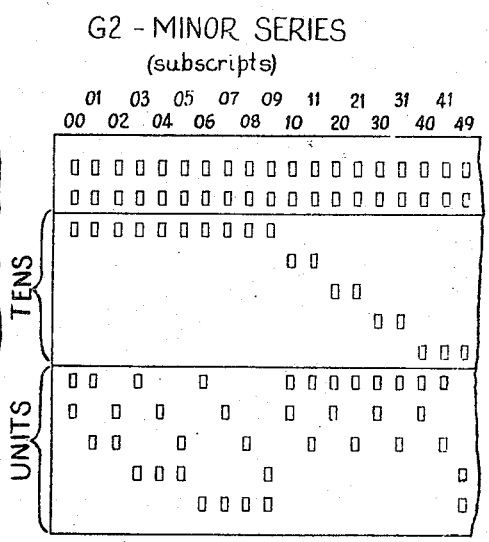

*Minor series F1.*—This series comprises those five hole combinations where three of the holes will occur in deck L in addition to the two holes in the U deck. There are ten of these and they are identified as the ten digits preceded by a diagonal as indicated in Fig. 22.

*Minor series F2.*—This grouping (Fig. 23) comprises those combinations where the three holes occur in deck I, and these are designated as digits 0 to 9 employed for superscript purposes.

*Minor series G1.*—In this series (Fig. 24) the three holes are arranged with two in deck I and one in deck L to provide 50 different combinations identifiable by 50 2-place numbers prefixed with a hyphen, of which the units digit is the two hole combination in deck I and the tens digit is the single hole in deck L.

*Minor series G2.*—Finally, the combinations of five holes in which the three holes not included in deck U are distributed with two in deck L and one in deck I to constitute 50 more combinations identified as 50 2-place numbers for subscript purposes. This G2 sub-series is the same as G1 with the decks I and L transposed, maintaining the units digits of the 2-place numbers identifiable by the two hole combination and the tens digit by the single hole.

Referring to Fig. 28, distribution of all the 792 five-hole combinations possible in a 12-position record column is briefly summarized to show ready identification of any particular combination. Thus, for example, the combination containing two holes in deck U, one hole in deck I and two in deck L constitutes a combination in the G2 subseries. The combination containing no holes in deck U, two holes in deck I and three in deck L constitutes the combination of the subseries B2 and so on.

Referring again to Fig. 26, it is noted that the perforations in column 14 constitute the first character of an expression as denoted by the presence of an X perforation while in column 15 are perforations identifiable as in the minor series G1, representing the subscript 05. The presence of the Y perforation in this combination also serves to identify this as part of the continuous expression commencing with the X hole in column 14 and continuing through to column 17 where another coding in the minor series identifiable as G1 indicates the value or reference —16. Column 18 represents the start of a new expression. The several columns of perforations are readily identifiable as to code and subcode in accordance with the detailed explanation given hereinabove.

The master card

Figure 27:
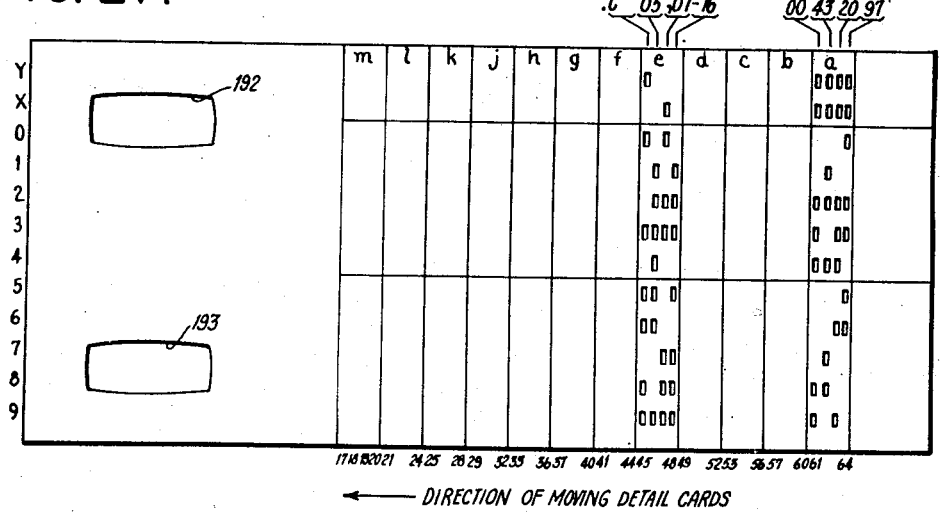
Fig. 27 is a master card which is to be used in conjunction with the new coding arrangement.

The master card is shown in Fig. 27. This card is to be provided with perforations representing information to be searched for in a group of record cards and, after it has been perforated, it is placed in the photoelectric scanning device of the scanning machine as described and claimed in my copending application Serial No. 153,197, filed March 31, 1950, where it is held while the record cards are moved across its surface in successive order, the movement being in the direction of the length of the cards.

For the purposes of the present invention, the master card has the same dimensional outline as the record cards and is provided with 12 fields, each comprising 4 columns, numbered from 17 to 64, as shown. Where particular data are to be searched for, a field of the master card is perforated to provide a complementary or inverse pattern of the punching as it would appear on the record card. This is illustrated in Fig. 27 where the first or right hand field is perforated to search for the value 00 43 20 97.

Comparison between perforations in this field and perforations in columns 2, 3, 4 and 5 of Fig. 26 will show this complementary or inverse punching relationship. Expressed in another manner, where an index point position in a column of the record card contains a perforation, the master card remains unperforated in such position, and conversely where an index point position in the record card is imperforate, the corresponding position in the master card contains a hole.

Assume now that the card of Fig. 26 is aligned vertically with the card of Fig. 27 and the record card is moved toward the left across the face of the master card. When columns 2, 3, 4 and 5 of the record card arrive in alignment with columns 61, 62, 63 and 64 of the master card, there will occur what is hereinafter termed a "blackout" condition, which will occur only when the two sets of four columns of the pair of cards are directly superimposed, so that in all index point positions in this field there is present an imperforate portion of either one or the other card.

As is more fully explained in my copending application Serial No. 153,197, filed March 31, 1950, a light source is provided on one side of the superimposed cards and a light responsive device on the opposite side and, when the blackout condition occurs, the light is cut off from the light responsive device. This serves as an indication that the value set up on the master card has been discovered in the record card.

Tabular coding arrangement

A modification of the scanning code previously described is the tabular notation system of representation where a single concept is represented by the presence of a single hole within a column of a defined field in a detail card.

In this tabular notation arrangement, the table as punched in a detail card represents a plurality of characteristics in accordance with a prearranged key or table index where each characteristic is represented in the card by the presence of a single hole. To punch a table of this sort, the indexer will refer to a table index chart which will list a multitude of characteristics in column and index point position form of a standard record card in order to determine the position that the wanted characteristics should be punched in a detail card.

In Fig. 29 there is a table index chart, identified as Table 97#, listing the States and two of the possessions of the United States which comprise possible locations of branch offices of a particular business organization. The position of each State or possession in the chart corresponds to a particular column and index position within a record card.

Now let it be assumed that the business organization concerned has branch offices in the States of California, Florida, Idaho, Iowa, Maine, Missouri, New York, North Carolina, Ohio, Pennsylvania, Rhode Island and South Carolina and that it is desired that these locations be punched in a detail card. The indexer on observing that California occupies the "3" index position in column 1 of the chart of Fig. 29 would indicate that State in the detail card by punching all unwanted positions by the wanted position "3" as shown in Fig. 30. In like manner the remaining branch offices would be punched in the detail card. It should be noted from Fig. 30 that the coding arrangement of the tabular notation system deviates from the previously described rule that there be a fixed number of holes in each column of the detail card. In fact in this tabular notation system the number of holes in each column of the detail card is limited only by the number of index positions in a card. The geographical locations of branch offices of other business organizations would be punched in a similar manner in separate cards.

In order that the tabular notation system of coding be differentiated from the coding notations for terms or expressions, as previously described, it is necessary that the U deck of the detail card of Fig. 30 have punched therein a distinguishing pattern different from that pattern which will indicate the presence of a term or expression. The distinguishing pattern of the U deck which sets aside the tabular notation coding system from the other coding arrangements is that the first column of the table proper is punched with at least a hole in the Y position followed by holes in the X and Y position of the remaining columns of the table. When only the Y position of the first column of the table is punched as in Fig. 30 it signifies that during the scanning operation a matching condition will be detected when the photocells of the individual compartments are blocked off from the source of light.

In transferring the data from the index chart to the detail card it is also necessary to punch the chart index number within the detail card. The index number of the chart of Fig. 30 is 97# which is punched in the detail card by resorting to the code representation of the subseries B2 of the Index series (see Fig. 16).

When a search is to be made to select all those organizations having branch offices in California, Iowa, Missouri and Rhode Island, the indexer by referring to the index chart of Fig. 29 would observe the position of these States and then punch the master card in the corresponding positions as shown in Fig. 31. The master card in the index column and the U deck is punched complementary to that hole pattern of the detail card. With regard to the hole pattern of the U deck of the master card, it is pointed out since this tabular coding arrangement permits the creation of several classes of tables as distinguished by the number of columns occupied that the master card must contain a perforation in the Y position of the next following column to the right of the table proper so as to produce a mismatch except when the number of table columns agree. In the table proper it is not necessary that the master card be punched in all positions inasmuch as the condition of the master card in the index column and the U deck are ample safeguards against accidental matching of other questions.

The master card of Fig. 30 upon being compared with the detail card of Fig. 31 will cause the photocells of the compartments concerned to be blocked off thereby indicating a matching condition and causing the card to be deposited in the selected card pocket. A matching between the detail card and master card will only exist when the master card favorably compares with the detail card as far as the four States sought for are concerned.

In the tabular coding arrangement, when the U deck of the detail card has a hole punched in the Y position of the first column of the table proper it signifies that a matching condition will be indicated whenever a blackout of the photocell concerned occurs. When the U deck of the detail card has a hole punched in the X and Y position of the first column of the table proper it indicates that a matching condition will be encountered whenever the photocell concerned is not blocked off from the light source.

In Fig. 32 there is shown in exaggerated diagrammatic form a detail card having superimposed thereon a master card. The holes punched in the detail card are represented by the solid rectangles while the holes punched in the master card are represented by the open rectangles.

The data punched in the detail card represents the same data punched in the detail card of Fig. 30. The twelve States which are represented in Fig. 30 by complementary punching are represented in the detail card of Fig. 32 by punching each State in a position corresponding to the index position of the State in the chart of Fig. 29.

The information sought for from the detail card of Fig. 32 is the same as that sought for from the detail card of Fig. 30 and the questions seeking such data are punched in the master card by punching the corresponding position that the four States occupy in the index table of Fig. 29. Thus the four question holes of the master card that are directed toward the table proper will overlap the corresponding holes in the detail card thereby permitting the source of light to impinge upon the proper photocell and indicating a matching condition.

While the columns of the table proper operate upon the principle that whenever a light is impinging upon the photocell associated with that portion of the master card directed towards the table proper a matching condition occurs, the index column, and the column following the last column of the table still operate upon the principle that a matching condition occurs only when the photocell associated with each of said columns is blocked out.

The keyboard

The mechanical arrangement of the keyboard will be described with reference to Figs. 1–10 and 12.

Figure 4:
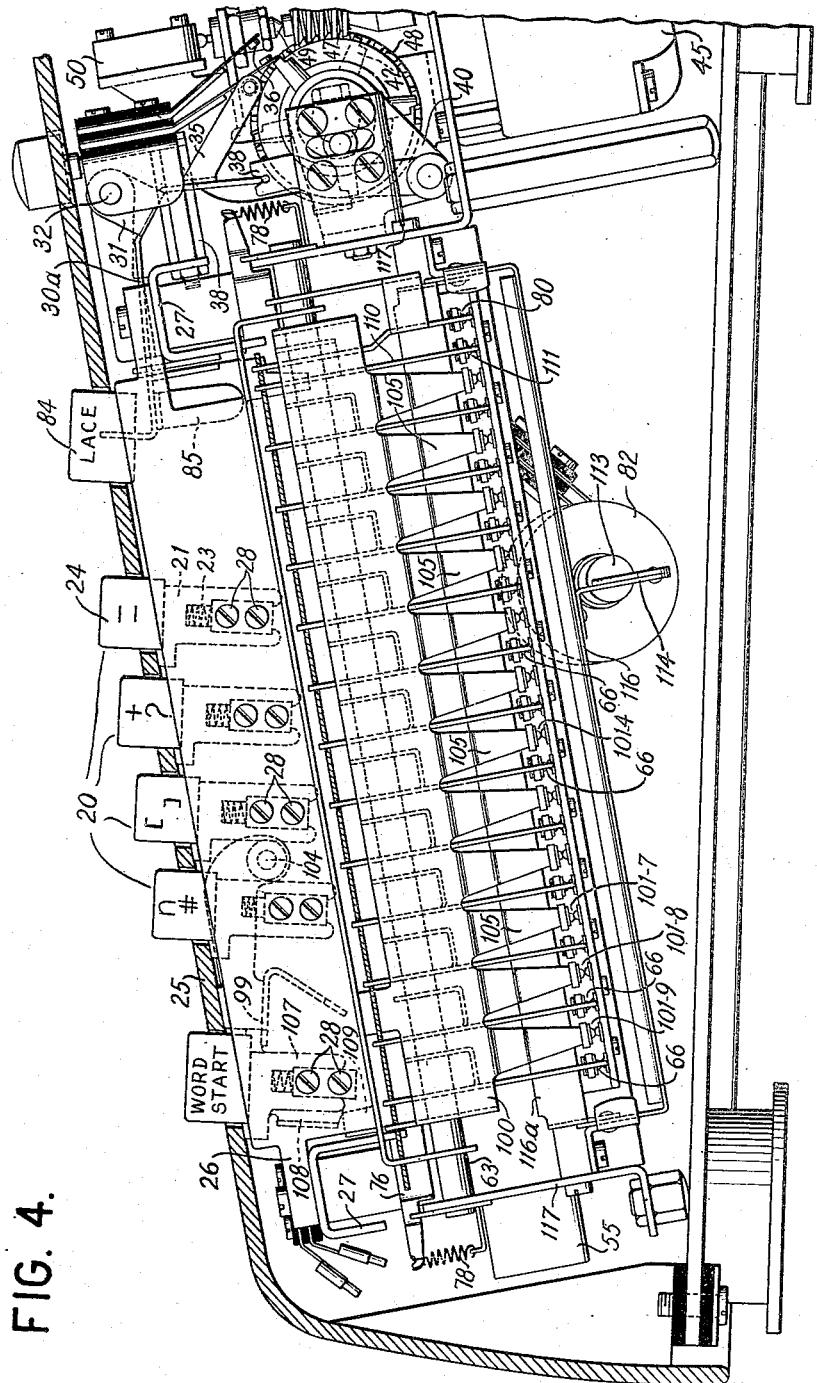
Fig. 4 is a cross sectional view taken along the lines 4—4 of Fig. 1.

The keyboard comprises four rows of keys 20 (Fig. 1) which are arranged generally to accommodate the standard keyboard as universally employed in typewriting machines. Each of the keys 20 comprises a key stem 21 (Fig. 2) slidably mounted in an opening in the cover plate 25 (Fig. 4) which slidably straddles the key stem guide bar 22, a spring 23 which biases the key stem 21 in an upward direction away from the guide bar 22, and a key cap 24 which is attached to the upper end of each key stem and bears indicia representing the character designated by the key. Each key has additional markings on the front face thereof (see Fig. 12) for purposes to be subsequently described. The stem guide bar 22 is secured at each end thereof to the supporting members 26 by fastening means 28 (Fig. 4). The supporting members 26 are, in turn, fixed at each end thereof to the key bail guides 27.

Also mounted upon the keyboard are the code selector keys 29 (Fig. 1) respectively bearing markings coinciding with the code notations of a particular series which are to be punched in a card. The key bearing the label "STD" will be depressed whenever it is desired to punch a record card according to the standard coding arrangement. The keys bearing the markings "A," "D," "E," and "B"
          G          C
                     F will be depressed whenever it is desired to punch a record card according to one of the coding notations of Series A, D, E and G, and B, C and F as previously described. The key bearing the marking "T" will, upon being depressed, condition the keyboard for punching a tabular notation within a record card. The key having the label "Lace" will be depressed whenever it is desired to punch an unused portion of the record card. It is necessary to lace the unused portion of the record card inasmuch as a card punched pursuant to the applicant's novel coding arrangement as set forth in Figs. 13 to 25 is used with the photoelectric card scanning device as described in the applicant's copending aforementioned application. A false indication would occur if the unused portion was not laced. For a further explanation of the purposes of lacing a detail card attention is directed to the aforementioned patent application.

The code selector keys are secured to one leg 30a of the key lever 30 (Fig. 6) having a second leg 30b angularly disposed with respect to the leg 30a. The key lever 30 through the offset portions 31 is movable about the key lever shaft 32. The key lever shaft 32 is supported at each end thereof by the mounting bar 33 (Fig. 1) and intermediate the ends thereof by the support brackets 34. The mounting bar 33 is secured to the upper key bail guide by means of a plurality of studs 37 such as shown in Fig. 1.

There is secured to the leg 30b of the key lever 30 of each of the code selector keys 29 a contact operating arm 35 (Fig. 6) which is made to cooperate with the associated contacts 36 mounted upon the bar 33. While there is shown a set of contacts 36 for each of the code selector keys 29, only the contacts associated with the Standard (STD), Tabular (T), and Lace keys are used in the electrical circuits as shall be explained subsequently.

The free end of the leg 30b of the key lever fits within the groove 38a of the pawl 38 (Fig. 6) movably secured to the shaft 39. The shaft 39 is supported at each end thereof by the member 40 (Fig. 6) fastened to the top key bail guide 27 as shown in Fig. 1.

Figure 5:
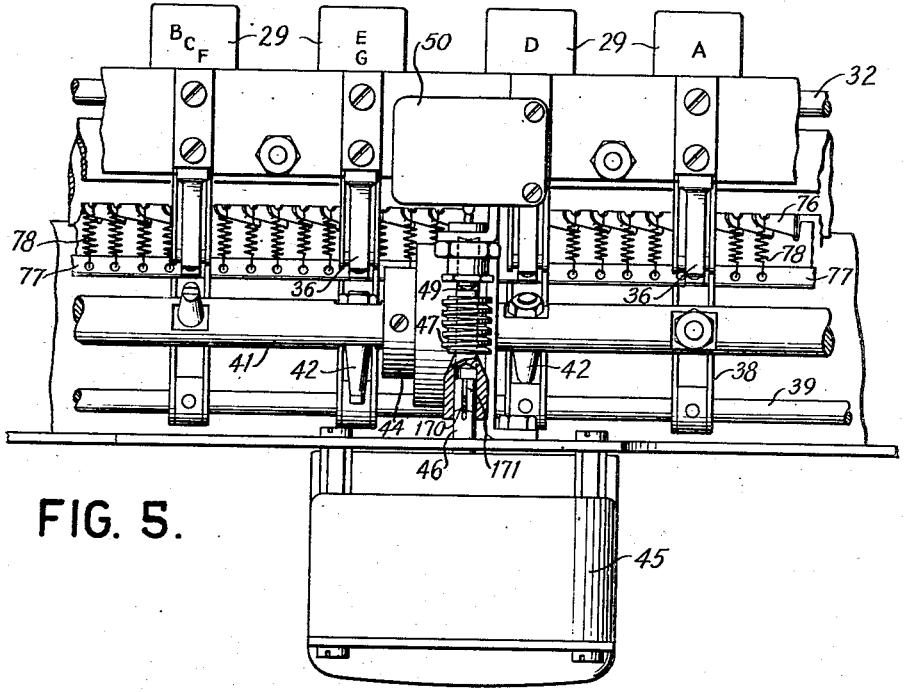
Fig. 5 is an enlarged cross sectional view taken along the lines 5—5 of Fig. 1.

Also carried by the member 40 is a code drive shaft 41 (Fig. 6) having seven projections 42 angularly disposed about the shaft in the manner such as shown in Fig. 12a and equal in number to the pawls 38, and adapted to be engaged by the corresponding pawl. The drive shaft 41 is driven counterclockwise as viewed in Fig. 6 under spring tension from a spring 43 (Fig. 7) mounted in the housing assembly 44 (Fig. 6) which surrounds the shaft 41. The spring 43 which has the inner end thereof secured to the shaft 41 and the outer end thereof to the housing 44 is wound by a motor 45 mounted to the bottom of the machine as shown in Fig. 5. The shaft 46 of the motor 45 drives a worm gear 47 which engages the gear 48 on the housing assembly 44 and turns the housing assembly 44 clockwise as viewed in Fig. 2.

With one of the code selector keys 29 being in a depressed position, the housing 44 and the spring 43 are prevented from turning by the associated projection 42 engaging the corresponding pawl 38 and the spring is completely wound. When another of the code selector keys 29 is depressed, the key 29 which was previously depressed is released in a manner to be subsequently described thus freeing the corresponding projection 42 from engagement with the associated pawl 38 and thereby releasing the shaft 41 so as to be turned by the spring 43. The shaft 41 will turn until the projection 42 corresponding to the key 29 now depressed engages the corresponding pawl. The turning of the shaft 41 decreases the tension on the spring 43 causing the plunger 49 to be released and resulting power being restored to the motor 45 whereby the spring 43 is rewound. When the spring 43 has been completely wound by the motor 45, the worm gear 47 which is secured to the shaft 46 by means of the key 170 mounted for vertical movement in the slot 171 is driven and rides upward on the gear 48 to engage the plunger 49 causing the contacts of the micro switch 50 to break the supply of power to the motor 45.

There is secured to each end of the drive shaft 41 a carriage drive end plate assembly 51 on which is mounted an eccentric arm 52 (Figs. 1 and 11). The eccentric arms 52 are each positioned between the blocks 53 and 54 (Fig. 1) fastened to the carriage end frame 55. The end frames 55 are connected at the front and rear by the carriage tie rods 56 (Fig. 6) as well as being mounted upon the rollers 57 (Fig. 3) fastened to the frame of the machine. As the code drive shaft 41 rotates from one pawl position to a second pawl position, the eccentric arms 52 will rotate causing a force to be exerted against the blocks 53 and 54 due to the spacing of the blocks which is less than the diameter of the circle which will be described by the eccentric arm. The force exerted on the blocks will cause the end frames 55 to move forward or backward for a limited distance whichever the case may be.

Figure 6:
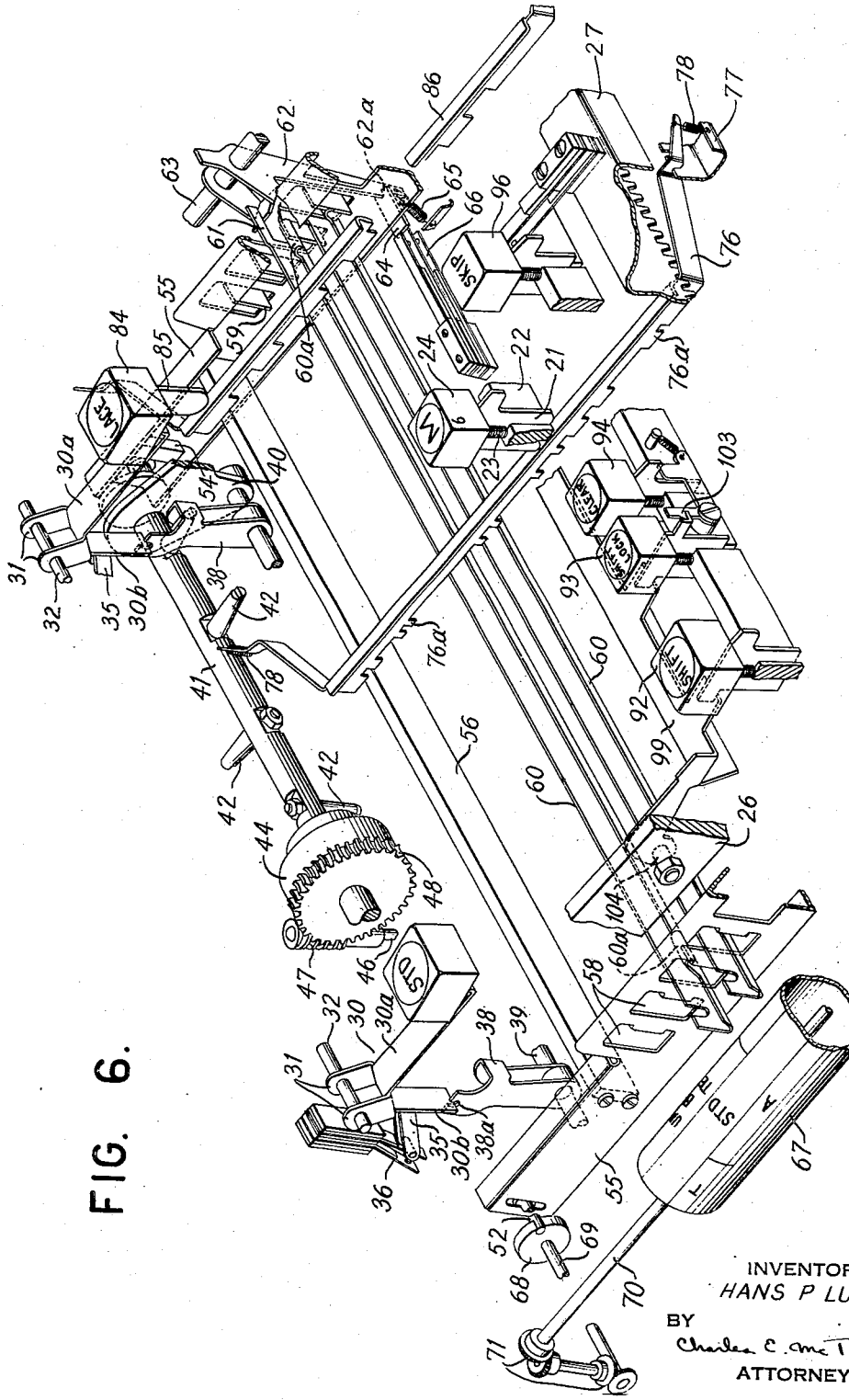
Fig. 6 is a perspective view partly cut away and partly in section of the mechanical arrangement of the elements of the keyboard.
Figure 17:
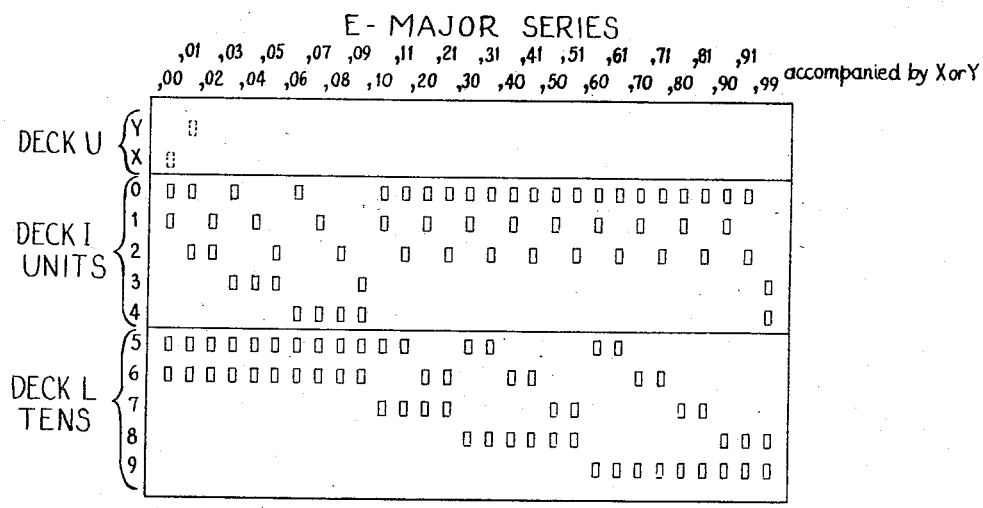
Figures 18, 19:
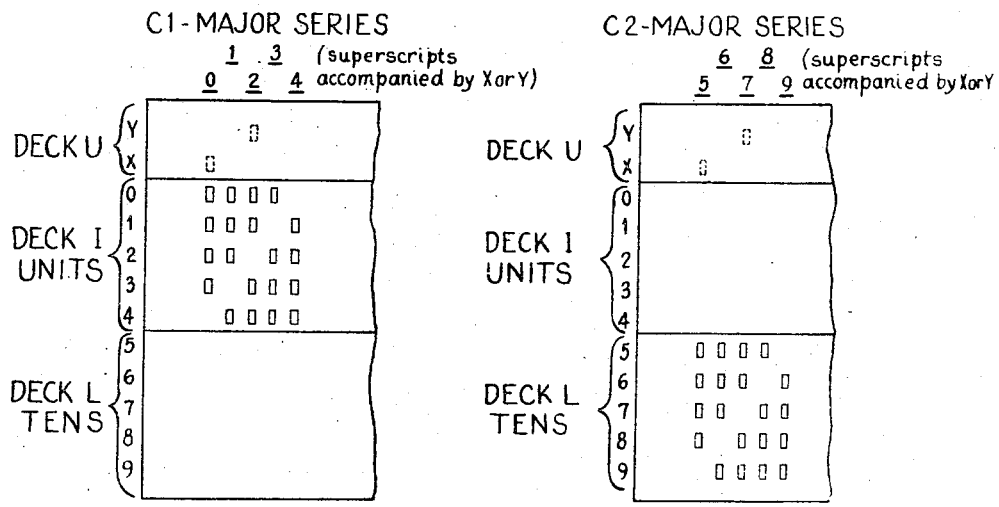

The carriage end frames 55 have twelve openings 58 having an offset portion 59 (Fig. 2) which cooperate in supporting twelve contact bails 60 (Fig. 6). The contact bail 60 is constructed in the form of a V which has a portion 60a (Fig. 2) at each end thereof of one of the free ends folded back on itself so as to enable the bail 60 to be suspended from the offset portion 59. The right hand portion of the other free end of the bail 60 has a finger elongation 61 (Fig. 6) which is adapted to actuate the bell crank lever 62. The bell crank 62 is pivotable about the shaft 63 which is fastened to the frame of the machine at each end thereof. The bell crank 62 at the lower end thereof has a shouldered portion 62a which is adapted to cooperate with the insulating member 64 (Fig. 3) secured to the contact blade 66a of the contacts 66. The bell crank 62 is normally biased in a clockwise manner about the shaft 63 by means of the spring 65 and when the member 64 is recessed within the shoulder 62a of the contact blade 66a of the contacts 66 is restrained from engaging the top contact 66b of the set of contacts 66. Whenever the bias effect of the spring 65 is overcome the contact blade 66a will be unlatched causing the upper contact 66b to be engaged by the contact associated with the blade 66a. It is to be noted that there is one set of contacts 66 for each one of the twelve contact bails 60, in addition to there being a set of contacts under the control of the "Word Start" key as shall be explained subsequently.

For visual reference as to what code is being punched in a record card, and what group of keys are necessary to be depressed to punch the indicated code into the card, there is provided a code indicator drum 67 (Fig. 6). This drum is positioned by the left hand eccentric arm 52 in accordance with what selector key 29 is in a depressed position. The free end of the left hand eccentric arm 52 is fixed in a slot in the disc 68 fastened at one end to the shaft 69. The other end of the shaft 69 is coupled to the drum shaft 70 through the miter gears 71. Thus it can be seen when the eccentric arm 52 is driven by the spring 43 due to the depression of one selector key and the release of the depressed selector key that the disc 68 turns the shaft 69 which through the gear arrangement described positions the drum 67 such that the marking on the drum which is on top coincides with the selector key depressed.

In Fig. 12 there is shown a diagrammatic view of the code selector drum 67 laid out in development in addition to the keys 20 having markings on the top side and the front face thereof. It is to be noticed from Fig. 12 that the drum 67 has five positions numbered I, II, III, IV and V while there is an individual projection 42, for each of the seven code selector keys. This difference may be accounted for by noting from Fig. 12a that the projections for the "T," the "A," and the "Lace" key are in the same plane and therefore share the common position III on the drum. While the drum will be moved into position III whenever the "Lace" key is depressed, it will not be effective as an indicator inasmuch as for the accomplishment of a lacing operation is not necessary to depress any of the keys 20.

When the standard (STD) key is depressed, the spring 43 will turn the shaft 41 until the corresponding projection 42 is restrained by an associated pawl 39 whereby the turning of the shaft 41 is halted. When the shaft 41 is brought to a halt, the drum 67 which is driven by the shaft 41, in a manner as previously described also stops and position IV will be face up indicating that all of the keys 20 are to be used for a standard coding operation.

When the "A" key is depressed at the time that the standard (STD) key is in a depressed position the standard key will be released and the "A" key will be locked in position. Depressing the "A" key will cause the position III of the drum to be face up thereby indicating that only the lower 3 rows of the keys 20 should be used for code series A.

When the "D" key is depressed, any previously held code selector key will be released and the "D" key will be locked in position. At the same time position II of the drum will be face up thereby indicating that all four rows of the keys are to be used for representing code series D.

Depressing code selector key

"E"
G will result in the drum being turned so that position I will be face up. This position of the drum indicates that for code series E, the top two rows of keys 20 will only be used and since this code is directed toward numerical representations the numerical markings on the front face of the keys will determine the key to be depressed. Likewise the drum indicates that the top row will be used for units digits while the next lower row will be used for representing tens digits. Position I of the drum indicates that the lower two rows of keys 20 will be used for representing the numerical characters of code series G. As in the case of series E, the markings on the front face of the key determines the key to be depressed inasmuch as series G is directed towards numerical representations. Also since the code notations of series G represents two digit numbers, the units digit will be represented by depressing the particular key in the lower row.

Depressing key

"B"
C
F will result in the drum being turned to position V thereby indicating that for code series B the top two rows will be used in a manner similar to code series E; that the third row will be used to represent the numerical notations of series C; and that the fourth row will be used to represent the numeral notations of series F.

Depressing the tabular (T) key will result in the the drum assuming position III face up thereby indicating that the top row only shall be used in representing this arrangement within a record card. For tabular notation the markings on the front face of the keys determine the keys to be depressed for a particular representation.

Finally upon depressing the "Lace" key, the drum will assume position III but it will be of no significance inasmuch as for this operation it is not necessary to depress any of the keys 20.

In order to enable the code selector key 29 to be retained in a depressed position during a punching operation, there is provided means for releasing a previously depressed key 29 at the time that it is desired to depress and lock a different key 29. As one of the selector keys 29 is depressed, the leg 30a of the associated key lever 30 cams the surface 72a (Fig. 8) of the movable plate 72 thereby causing the plate 72 to move to the left and enabling the other selector key which had been in a locked position to be released. The leg 30a after clearing the surface 72a is then locked in position by the lower portion of the surface 72a in conjunction with the bias effect of the spring 73 which has one end secured to the movable plate 72 and the other end secured to the upper key bail guide 27 by means of a stud 74 projecting through the slot 75 of the movable plate 72. Thus it is to be noted when one of the code selector keys is depressed at a time that another code selector key is in a depressed or locked position that the latter key will be released while the former key will be locked in position.

There is associated with each key 20 of the keyboard a key bail 76 (Fig. 6) having a plurality of lugs 76a arranged in accordance with any permutation code such that upon depressing one of the keys 20 of the lugs 76a of the corresponding bail will selectively actuate five of the contact bails 60. The bails 76 are aligned by the key bail guides 27 (Fig. 6) and pivotably supported near each end thereof by the key bail comb 77. The bails 76 are normally positioned away from the contact bails 60 through the medium of the springs 78 exerting a downward force upon each end of the bails 76.

A common bail 79 pivotable about the stud 79a (Fig. 2) at each end thereof and having an associated bell crank lever 62 and contacts 80 (Fig. 4) is actuated by any one of the key bails 76 by means of the corresponding lug 76b (Fig. 2) such that the contacts 80 are unlatched by the corresponding bell crank 62. As shall be pointed out subsequently the unlatching of the contacts 80 upon being unlatched from making any circuit involving an appreciable amount of current. There is connected to the underside of the common bail 79 a projection 83 (Fig. 2) which when the common bail 79 is actuated causes the contacts 81 (Fig. 2) to be closed. As shall be described subsequently, the closing of the contacts 81 provides a holding circuit for the reset solenoid 82 thereby preventing double punching in the event a key is held depressed after the completion of a punch cycle.

As previously pointed out, the unused columns of a detail card are punched with six holes to each unused column in order to prevent a false operation during a scanning process. The key which enables this punching operation to be initiated in the lace key 84 which is in the same row of keys as the code selector keys. The lace key 84 (Fig. 6) as in the case of the code selector keys 29, has an associated key lever 30 and contacts 36 in addition to the lug 85 (Fig. 6) which is connected to the bottom of the lace key lever. Upon depressing the lace key 84, the lug 85 will push down upon the lace key bail 86 which will, in turn, engage the six required contact bails 60 causing the corresponding contacts 66 to be unlatched and thereby conditioning the punch machine for a lacing operation as shall be made clearer subsequently.

For punching data within a record card according to the tabular coding arrangement there is provided a Tabular key 87 (Fig. 1) which is located in the same row as the code selector keys 29 and the lace key 84. The Tabular key 87, as in the case of the code selector keys, has an associated key lever and contacts. The Tabular key 87 is used in conjunction with either the "T oper" key 88 or the "TC oper" key 89 in order that the punching circuit be conditioned for Tabular notation punching operation. When the "T oper" key 88 is depressed at the time when the Tabular key 87 is depressed, the contacts 90 (Fig. 1) associated therewith are closed thereby completing the circuit for the normal punching of the table. When the "TC oper" key 89 is depressed at the time the Tabular key 87 is depressed, the contacts 91 associated therewith are closing thereby completing the circuit for punching the table in complement form.

Figures 7, 8:
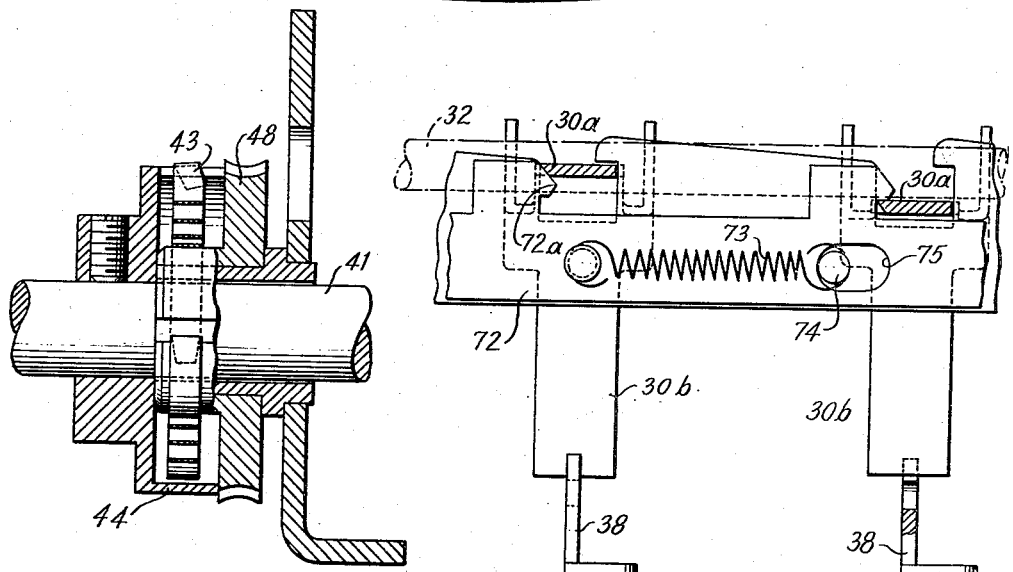
Fig. 7 is a sectional view taken along the line 7—7 of Fig. 2 showing the position of the spring within the housing, and the gear associated therewith.
Fig. 8 is a sectional view taken along the lines 8—8 of Fig. 2 showing the locking means for the code selector keys.

It is to be noted that the code selector keys 29, the Tabular key 87 and the lace key 84 are all subject to the latching feature which has been described and is shown in Fig. 8. Due to this latching feature when one of the aforementioned keys is in a locked position at the time another one of the keys is depressed, the former key will be released while the latter key will be locked in position.

There is also mounted upon the keyboard a shift key 92, a shift lock key 93, a clear key 94, a space key 95, a skip key 96, a release key 96a, a stacker key 97, and a word start key 98 (Fig. 1).

The keyboard is arranged to normally cause either of the subseries A1, B1, C1, C2, D1, E, F1 and G1 as selected by the code selector keys 29 to be punched within a detail card. In order to punch a record card according to either of the subseries A2, B2, D2, F2 and G2, there is provided a shift key 92 which when depressed engages the shift key bail 99 which, in turn, through the projection 106 (Fig. 3) causes the shift key contact bail 100 to unlatch simultaneously all ten contacts 101. The closing of these contacts 101 in conjunction with the closing of the contacts 66 which occurs upon depressing of one of the keys 20 will cause the character represented by the depressed key 20 to be punched in the detail card in the positions transposed from those positions which said character will be punched when the shift key is not depressed. The bail 99 is pivotally mounted at each end thereof by means of the stud 104 (Fig. 6) to the supporting member 26. The contact bail 100 is an integral unit comprising twelve fingers 105 of which only ten of the fingers 105 are used to unlatch the corresponding contacts 101 whenever the key 92 is depressed. The contact bail is pivotally mounted on the shaft 63 (Fig. 4). The contacts 101 are similar to the contacts 66 and are returned in a latch position in the same manner.

If considerable punching is to be done in the series A2, B2, D2, F2, and G2 thus necessitating the shift key 92 to be held depressed for some time, there is provided a shift key lock 93 which will retain the bail 99 depressed. The shift lock 93 is held in the depressed position by the shift lock latch 103 (Fig. 9). In order to release the shift lock latch 103 there is provided a clear key 94 which when depressed cams the latch 103 from engagement with the key 93 enabling the shift bail 99 to return to the normal position thereof. There is associated with the clear key 94 the contacts 102 which are closed upon the depressing of the key 94. The contacts 102 upon being closed complete a circuit whereby the reset solenoid 82 is energized causing the relatching of all contacts.

As previously referred to, the presence of a hole in the X position of deck U identifies the character represented as one constituting the beginning of a word, term or expression while the presence of a hole in the Y position indicates that the accompanying code combination represents the character within the word, term or expression. The keyboard circuit is arranged to normally cause the Y position within a card to be perforated for each of the coding arrangements of the major series. When it is necessary that the X position be perforated, the word start key 98 (Fig. 1) is used. The word start key 98 has a key stem 107 with an offset portion 108 (Fig. 3) which, as in the case of the keys 29, straddles the associated key guide bar 22. Whenever the word start key 98 is depressed, the offset portion 108 engages the word start bail 109 which, in turn, operates the associated bell crank lever 110 (Fig. 3) causing the word start contacts 111 (Fig. 4) to be unlatched. The unlatching of the contacts 111 will then condition the allied circuits for the punching of the X position within a card. As is the case in all situations, the reset solenoid will, at the end of the punch stroke, relatch all contacts.

The Space 95, Skip 9, and Stacker 97 keys are similar to the corresponding keys explained and described in Patent No. 2,394,604, granted February 12, 1946, to E. A. Ford. In Patent 2,394,604 the stacker key is termed "Release Key," see key 658 in Fig. 30 therein. It is believed sufficient to state that the spacer key 95 upon being depressed causes the card to be advanced one column without being punched. The skip key 96 causes the card to be advanced a number of columns without causing any punching to take place. The release key 96a works in conjunction with a movable rack which key upon being depressed causes the card to be released out to the 80th column from any intermediate point on the rack. The stacker key 97 causes a card to be stacked if the rack is in column 80.

There is also provided a reset solenoid 82 which becomes energized at the completion of each punch stroke thereby causing any contacts previously unlatched for a punching operation to be relatched. The solenoid 82 is secured to the underside of the frame of the machine by means of the bracket 112 (Fig. 3) and has a movable core 113 to which is attached a reset bail lever 114 through a connecting link 115. There is fixed to the reset bail lever 114 a reset bail 116 (Fig. 4) having the bracket 116a which is pivotably mounted at 117 at each end thereof to the frame of the machine and is adapted to cooperate with the insulating member 64. Whenever the solenoid is energized the connecting link 115 (Fig. 3) will move to the left causing the bracket 116a to be moved in a clockwise manner about the point 117 thereby engaging the insulating member 64 and causing the contact blade 66a to once again be placed under the restraint of the shouldered portion 62a of the bell crank 62.

*Circuit diagram and operation*

The operation of the machine will now be described in connection with the wiring diagram of Figs. 33a, 33b and 33c.

Upon closing the main switch 118 (Fig. 33a) a source of current is supplied to the thermal coil 124 (Fig. 33c) through a complete circuit which may be traced from line 121 coupled to the positive side of the main source of power, line 125, contacts R34a of the time delay relay R34 normally closed, resistor RR1, thermal coil 124 to the line 122 coupled to the negative side of the main source of power. As the thermal coil 124 is heated, the normally open points 124a of the coil 124 will close thereby causing a circuit to be completed from line 121, line 125, contacts 124a now closed, time delay relay R34 to the line 122 whereby the relay R34 is energized and the contacts R34a shifted and R34b (Fig. 33c) closed. With the energization of the relay R34, the contact points R34a shift from the position shown thereby opening the circuit through the thermal coil 124 and retaining the circuit through the relay R34. The thermal coil 124 is employed for the purpose of preventing the operation of the keyboard until the heating of the filaments of the tubes V1 and V2.

Let it be assumed that the switch 118 (Fig. 33a) is closed thereby supplying a potential of 40 volts to the keyboard, and that the card carriage is in the 80th column causing the last column contacts 120 (Fig. 33a) to be closed. The closing of the contacts 120 establishes a circuit which is traceable from line 121, line 123, contacts 120 now closed, relay R17, to the line 122 whereby the relay R17 is energized and the contacts R17a (Fig. 33c), R17b and R17c (Fig. 33a) shifted.

Now if the punch magnet PM (Fig. 33c) was in an energized state which it is not, the closing of the contacts R17a (Fig. 33c) would establish a circuit in parallel with the energized punch magnet PM (Fig. 33c) which would cause the pick-up coil of the eject relay R16 to be energized. This circuit may be traced from one side of the punch magnet, auto-eject switch 126 in a closed position, contacts R17a now closed, relay R16, resistor RR6, to the other side of the punch magnet PM. The energizing of the pick-up relay R16 would close the contacts R16a (Fig. 33a) thus completing a circuit to the eject magnet EM (Fig. 33a) which may be traced from line 121, line 123, contacts 120 now closed, contacts R16a now closed, line 127, eject magnet EM to the line 122. At the same time the holding coil of the relay R16 is energized in parallel with the eject magnet EM thereby enabling the eject magnet circuit to be retained until the contacts 120 break.

Figure 2:
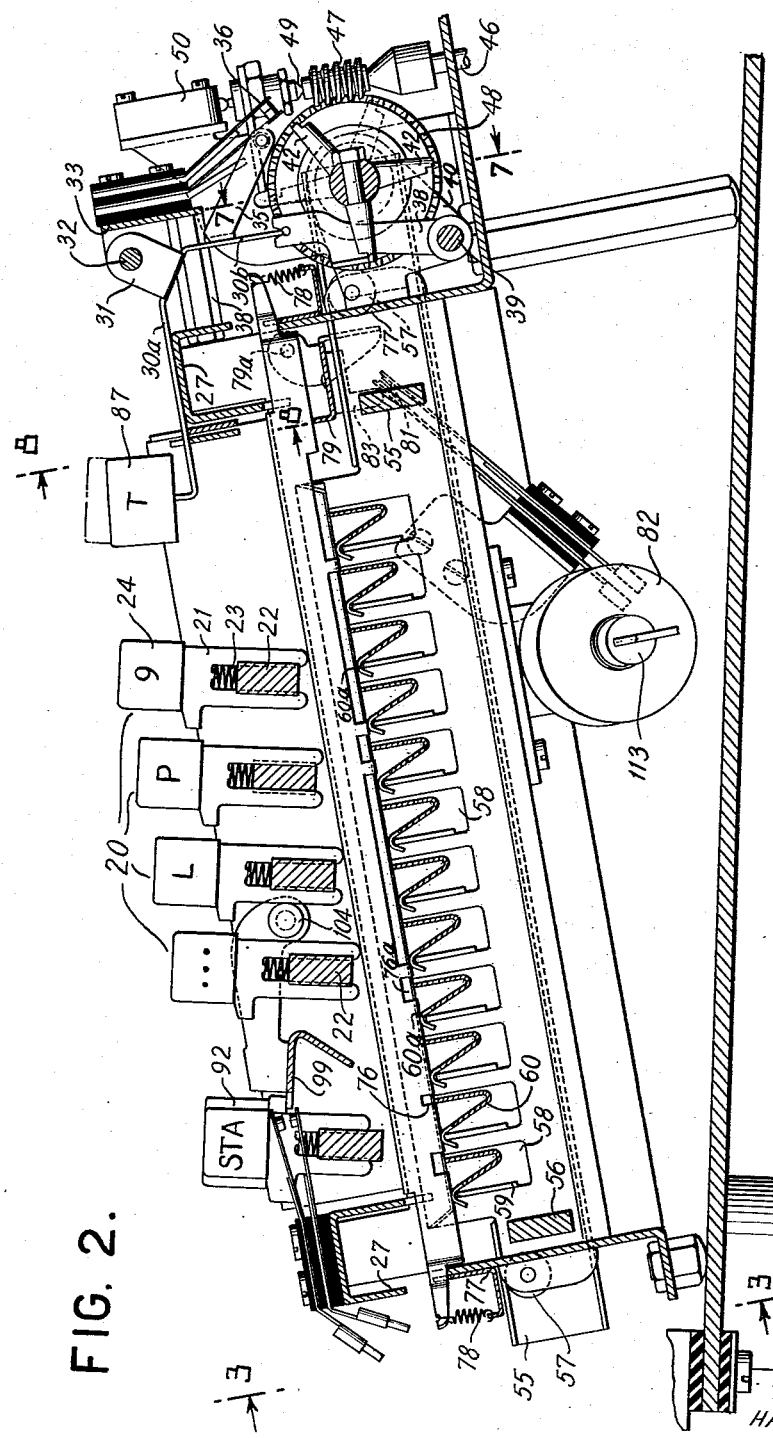
Fig. 2 is a cross sectional view taken along the lines 2—2 of Fig. 1.
Figure 3:
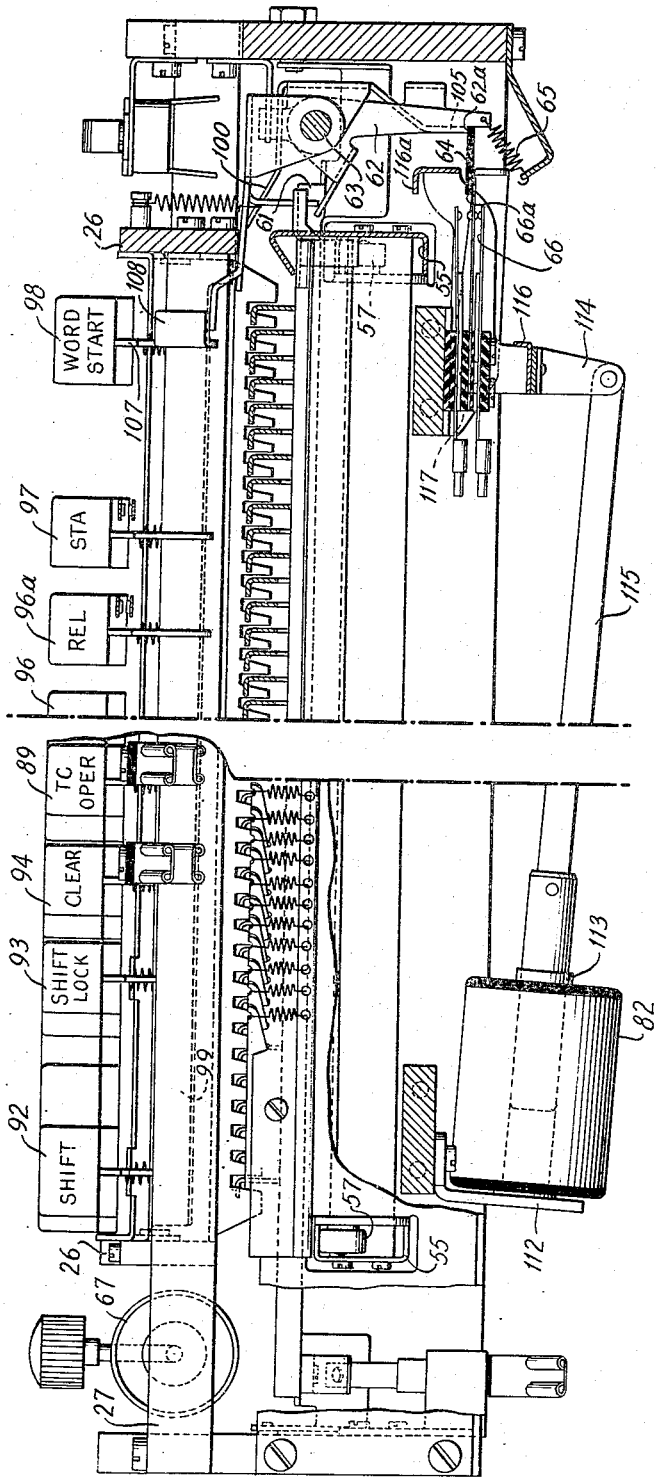
Fig. 3 is a cross sectional view partly cut away and taken along the irregular section on lines 3—3 of Fig. 2.

But since the punch magnet is not energized, it becomes necessary in order to return the card carriage to the card receiving position to depress the stacker key 97 (Fig. 1) causing the closing of the associated contacts 97a (Figs. 2 and 33a). The contacts upon being closed will complete an obvious circuit through the now closed last column contacts 120 to cause the eject magnet EM and the hold coil of the eject relay R16 (Fig. 33a) to be energized. As previously described the hold coil of the eject relay R16 will enable the eject magnet circuit to be retained until the contacts 120 break.

The eject magnet EM upon being energized will idly actuate the ejector resulting in the auto-start contacts 128 (contacts 84 in Patent No. 2,424,097) being closed in a manner as described in Patent No. 2,424,097. Upon being closed, the auto-start contacts 128 (Fig. 33a) establish a circuit which is traceable from line 121, contacts 120 now closed, line 129, contacts 128 now closed, trip magnet TM (trip magnet 32 in the aforementioned patent), brush magnet contacts BMa normally closed to line 122 whereby the trip magnet TM (Fig. 33a) is energized.

Upon being energized the trip magnet TM causes the latch contacts 130 (Fig. 33a) to open and the latch contacts 131 (Fig. 33c) to be closed. Upon closing the latch contacts 131 establish a circuit to drive the card feed motor CFM (Fig. 33c) from the 110 volt power source G whereby a card will be fed from the hopper to the card carriage which has automatically returned to a card receiving position thereby opening the contacts 120 and causing the trip magnet TM, the eject magnet EM, and the relay R17 to be de-energized. At the end of the feeding cycle, the circuit to the motor CFM will be broken and the latch contacts 130 closed.

After the card carriage has returned to a card receiving position, a circuit will be established for the relay R27 (Fig. 33a) which may be traced from line 121, latch contacts 130 now closed, contacts R17c normally closed, floating cam contacts 132 normally closed, relay R27 to the line 122 whereby the relay R27 is energized and the associated contacts R27a to R27p shifted from the normal position thereof. Summarizing, the card carriage is returned to a card receiving position concurrently with the advancement of the first record card into the carriage thereby enabling the first column thereof to be presented to the row of punches 173, one of which is shown in Fig. 10.

For this operation the switch 119 (Fig. 1) is set in the normal position N. The switch 119 is actually a double pole, during throw switch but for convenience will be treated here as if it were two separate switches 119a (Fig. 33a) and 119b (Figs. 33c).

Now assuming that it is desired to punch the character "a" in a detail card, it is to be noted from Fig. 13 that this character is represented by the code arrangement of series A1. The operator will then depress the "A" code selector key 29 which will free any other key 29 and enable same to return to the normal position while at the same time locking the "A" selector key 29 in position.

Depressing the "A" selector key 29 will cause shaft 41 (Fig. 6) driven by the spring 43 to rotate until the projection 42 associated with the "A" selector key 29 enages the corresponding pawl 38. The turning of the shaft 41 will, through the gears 71, position the code indicator drum 67 so as to indicate the row or rows of keys 20 to be used in order to represent the code notations of series A1 within a detail card. From Fig. 12, it is to be noted that the drum 67 upon being positioned by the shaft 41 will indicate that all rows of keys 20 except the top row will be used for series A1.

The depressing of the "A" key 29 will, due to the operation of the eccentric arm 52 and the blocks 53 and 54 cause also horizontal movement of the carriage side frame 55 and, as a result, position the contact bails 60 so as to be engaged by the proper key bail 76 when the keys 20 are depressed.

The keyboard is now in condition for further operation. The operator will depress the key 20 bearing the marking "A," for example, causing the associated key stem 21 to engage the corresponding key bail 76 which, in turn, by means of the notches 76a moves the five appropriate contact bails 60 about the supporting positions 60a. The five selected contact bails 60 will, through the corresponding fingers 61, cause the associated bell crank 62 to be moved counterclockwise about the shaft 63 thereby overcoming the bias of the spring 65 and unlatching the contacts 66—9, 66—8, 66—7, 66—6, and 66—5 (Fig. 33b).

At the same time that the "A" key 29 is depressed, the associated key bail 76 will engage the common bail 79 which through the medium of the corresponding bell crank lever will unlatch the common bail contacts 80 (Fig. 33a). The closing of contacts 80 will establish a circuit for the common bail relay R25 (Fig. 33a) which may be traced from line 121, latch contacts 130 now closed, contacts R17c now closed due to the last column relay R17 being unenergized, contacts R27a now closed due to R27 being energized, common bail contacts 80 now closed, relay R25, to the line 122 whereby the relay R25 is energized and the associated contacts R25a (Fig. 33a) closed. The relay R25 has a 19 millisecond delay in order to prevent arcing when the contacts 66 become unlatched.

The closing of the contacts R25a enables a circuit to be established whereby the respective interposer magnets IM9, IM8, IM7, IM6, and IM5 are energized. These circuits may be traced from line 121, latch contacts 130 now closed, line 133, contacts R25a now closed, contacts R24a normally closed, contacts R23c normally closed, switch 199a in normal position N, line 134, unlatched contacts 66—9, 66—8, 66—7, 66—6, and 66—5 (Fig. 33b), corresponding lines 135, respective contacts 101—9, 101—8, 101—7, 101—6, 101—5 all normally closed, corresponding lines 136, respective contacts R18p, R18o, R18n, R18m, and R18k all normally closed, corresponding lines 137 all normally closed, corresponding contacts R27p, R27o, R27n, R27m, and R27k all now closed, corresponding resistor RR3, interposer magnets IM9, IM8, IM7, IM6 and IM5 to the line 122.

The energizing of the interposer magnets causes the associated contacts IM9a, IM8a, IM7a, IM6a and IM5a (Fig. 33a) and the contacts PMa (Fig. 33c) to close thereby establishing a circuit for the energizing of the follower relays F9, F8, F7, F6 and F5. This circuit is traceable from line 121, latch contacts 130 now closed, line 138, contacts IM9a, IM8a, IM7a, IM6a and IM5a, corresponding relays F9, F8, F7, F6 and F5 to the line 122 whereby the follower relays are energized and the associated contacts are closed.

Referring to Figure 10, the mechanical effect of the energization of one of the interposer magnets, such as IM9, will now be described. Upon being energized, the magnet IM9 causes the actuating of the key 173 through the armature lever 174 which is pivoted at one end 174a while the other end is formed into a rounded head extending into the shank of the key 173. As the key 173 is depressed, it operates the bell crank 175 to move the interposer 176 to the left under the motor plate 177 against the bias of the interposer spring 178. At the same time that the interposer 176 moves to the left, the projection 179 secured to the interposer exerts a force against the member 180 causing the interposer contacts IM9a to be closed. Likewise as the interposer moves to the left, it pushes the contact lever frame 181 forward. The contact lever frame 181 is revolved about its pivot shaft 182 and lifts the contact hook 183, closing the punch magnet contacts PMa.

The energizing of the follower relays sets up a conditioning circuit 184 (Fig. 33c) consisting of intercoupled contact points of the follower relays which will complete a circuit to the punch magnet only when five interposer magnets are energized. The circuit may be traced from line 121, potentiometer RR4 (Fig. 33c) supplying a source of voltage of 24 volts, contacts R18c normally closed, contacts R33c normally closed, contacts R22a normally closed, contacts R24b normally closed, contacts F0a, F1b, F2c, F3d, F4e all closed, contacts F11 as shown, contacts R35g as shown, contacts F12f normally closed, contacts F9e, F8d, F7c, F6b and F5a all shifted, punch magnet contacts PMa now closed to the control grid of each of the tubes V1 and V2, shown as two C3J rectifier tubes.

The cathodes of the two tubes V1 and V2 are tied together with the junction being coupled to one side of the punch magnet PM while the anodes of V1 and V2 are coupled to the opposite ends of the secondary winding of the transformer T. The other end of the punch magnet PM is coupled to the mid-point of the secondary winding of the transformer T. The primary winding of the transformer is coupled to a source of potential G of 110 volts which also supplies the card feed motor CFM whenever the latch contacts 131 are closed. By means of the potentiometer RR5 the control grid of each of the tubes are biased negatively with respect to the cathode. There is connected in parallel with the punch magnet PM, a circuit comprising the contacts R17a normally open, the pick up coil of the relay R16 and the resistor RR6, the operation of which has been previously described.

Now during each half cycle of the alternating current supply, the voltages on the anodes of the two tubes reverse such that in one half cycle the anode of V1 is negatively biased with respect to its cathode while the anode potential of V2 is positive with respect to its cathode while in the next half cycle the conditions are reversed.

Thus when a positive pulse is applied through the conditioning circuit to the control grids of V1 and V2, the tube having its plate potential positive with respect to the cathode at that instant will be made conducting since the positive pulse will overcome the bias of the control grid. Upon either one of the tubes V1 and V2 being made conductive, the punch magnet PM is energized causing the operation of the appropriate interposers resulting in perforations being made in the "9," "8," "7," "6" and "5" index point positions.

Referring to Fig. 10, the punch magnet PM upon being energized attracts the armature 185 to its core. This movement, operating through the linkage 186, pulls downward on the motor plate 177 which, in turn, through the interposer 176 drives the punch 172 through the proper index point position in the record card into the die. When the punch magnet armature 185 has reached the limit of its travel, the circuit breaker 187 operates against the foot of the contact hook 183 and allows the punch magnet contacts PMa to spring open, deenergizing the punch magnet PM. The armature 185, on being released, is pulled back to its original position by the spring 188.

At the completion of the punch stroke the escapement mechanism which is of the same general nature as that disclosed in the Patent 2,107,161 granted February 1, 1938, to R. E. Page, will be made effective and the rack and card carriage will advance one tooth to permit punching in the next column of the card. At the same time the floating cam contacts 132 (Fig. 33a) are opened thereby dropping out the relay R27 and opening the circuits to the respective interposer magnets IM.

Likewise at the end of the punch stroke when the floating cam contacts 132 and 133 open and the relay R27 is deenergized, the reset solenoid 82 is energized thereby restoring all unlatched contacts to a latching position. The circuit for energizing the solenoid 82 is traceable from line 121, latch contacts 130, line 138, contacts R18g (Fig. 33a) normally closed, contacts R23b normally closed, contacts 27b closed whenever R27 is deenergized, coil of the reset solenoid 82, to the line 122.

In order to prevent double punching in the event a key is held depressed after a punch cycle, there is provided an interlocking circuit arrangement which becomes operative with the opening of the floating cam contacts 132 and 133 at the end of each punch cycle. When the floating cam contacts 132 open, the relay R27 is deenergized and the contacts R27c restored to a normally closed position thereby causing a circuit to be established which will energize the relay R33 (Fig. 33a) and close the contacts R33a and R33b. This circuit may be traced from line 121, latch contacts 130, contacts R18g and R23b normally closed, contacts R27c normally closed, relay R33, to the line 122. In the event the key is still depressed when the floating cam contacts 132 and 133 make for the next punch cycle, a hold circuit for relay R33 is set up around the points R27c which will open when the contacts 132 close through the closed bail contacts 81 and the contacts R33a now closed while a hold circuit for the coil of the reset solenoid 82 is set up around the points R27b by the contacts R33b. Thus the reset solenoid will be kept in an energized position until the depressed key is released.

Thus it is to be noted that upon depressing the "A" key 20 the record card concerned will have punched therein the code notation for the lower case character "a" pursuant to the code series A1 and that after the punching cycle the second column of the card is now in position for a punching operation. It is also to be noted that the punch magnet PM will only be energized when five interposer magnets are energized.

The conditioning circuit 184 is an electrical adding network consisting of the set of contacts of each of the associated follower relays being so arranged as to enable an electrical pulse to pass therethrough to cause the energization of the punch magnet PM whenever the sum added is equal to either a value 5 or 7 depending upon the operating conditions.

The circuit or network 184 is divided into two portions with each of the portions being intercoupled with each other through a set of contacts associated with the relay R35 the position of which determines whether the pulse is to be fed to the punch magnet for a sum equal to the value of 5 or 7.

The upper portion consists of the set of contacts of the follower relays F0, F1, F2, F3, F4 and F11 arranged in an ascending order, where each set of contacts when in a transferred position is to be considered as representing unity. This portion of the circuit is arranged to represent any summation of values from zero (0) to six (6) by the completion of a circuit through the maze of contacts of the associated follower relays to the output contacts of the relay F11.

The lower portion of the circuit 184 consists of the set of contacts F12, F9, F8, F7, F6 and F5 disposed in a descending order where each set of contacts is to be considered as representing unity. This portion of the circuit also is capable of representing any summation of values from zero (0) to six (6) as represented by a completed circuit therethrough.

The purpose of the conditioning circuit 184 is to enable the punch magnet to be energized whenever five or seven of the follower relays are in an energized state. Since the upper and lower portion of the network 184 are capable of each representing a sum equal to the value of six (6), the two portions are intercoupled through the set of contacts of R35 such that a completed path will be made through the network only when the sum added is five (5), with R35 in an unenergized state, or only when the sum added is seven (7), with R35 in an energized state. For example, with R35 in an unenergized state, and assuming that the follower relays F0, F11, F12, F9 and F5 are energized then the shifted contacts F11e, representing the value 2, would be coupled to the shifted contacts F12c, representing the value 3. With the relay R35 being energized, and assuming that the relays F0, F2, F3, F4, F8, F7 and F6 are energized, then the contacts F11b, representing the value 4, would be coupled to the contacts F12d, representing the value 3, through the shifted contacts R35c.

As previously mentioned the conditioning circuit 184 is an electrical network consisting of the intercoupled contact points of the follower relays which when the relay R35 is not energized will complete a circuit to the punch magnet only when any combination of five interposer magnets are energized, or when the relay R35 is energized only when any combination of seven interposer magnets are energized.

If it be assumed that only four of the follower relays, for example, F0, F4, F9 and F8, are in an energized state when R35 is not energized, it would be found upon tracing the circuit through the conditioning circuit 184 that the circuit would not be completed to the punch magnet PM due to an open circuit existing at contacts F6a.

Likewise if it be assumed that only six of the follower relays, for example, F0, F2, F11, F9, F8 and F6, are in an energized state when R35 is not energized, it will be found upon tracing the circuit through the conditioning circuit 184 that an open circuit occurs at contacts F6a thereby preventing the unwanted energization of the punch magnet PM.

Punching of code series A2

Now let it be assumed it is desired that the letter "A" of series A2 (Fig. 14) be punched in a detail card.

Figure 33B:
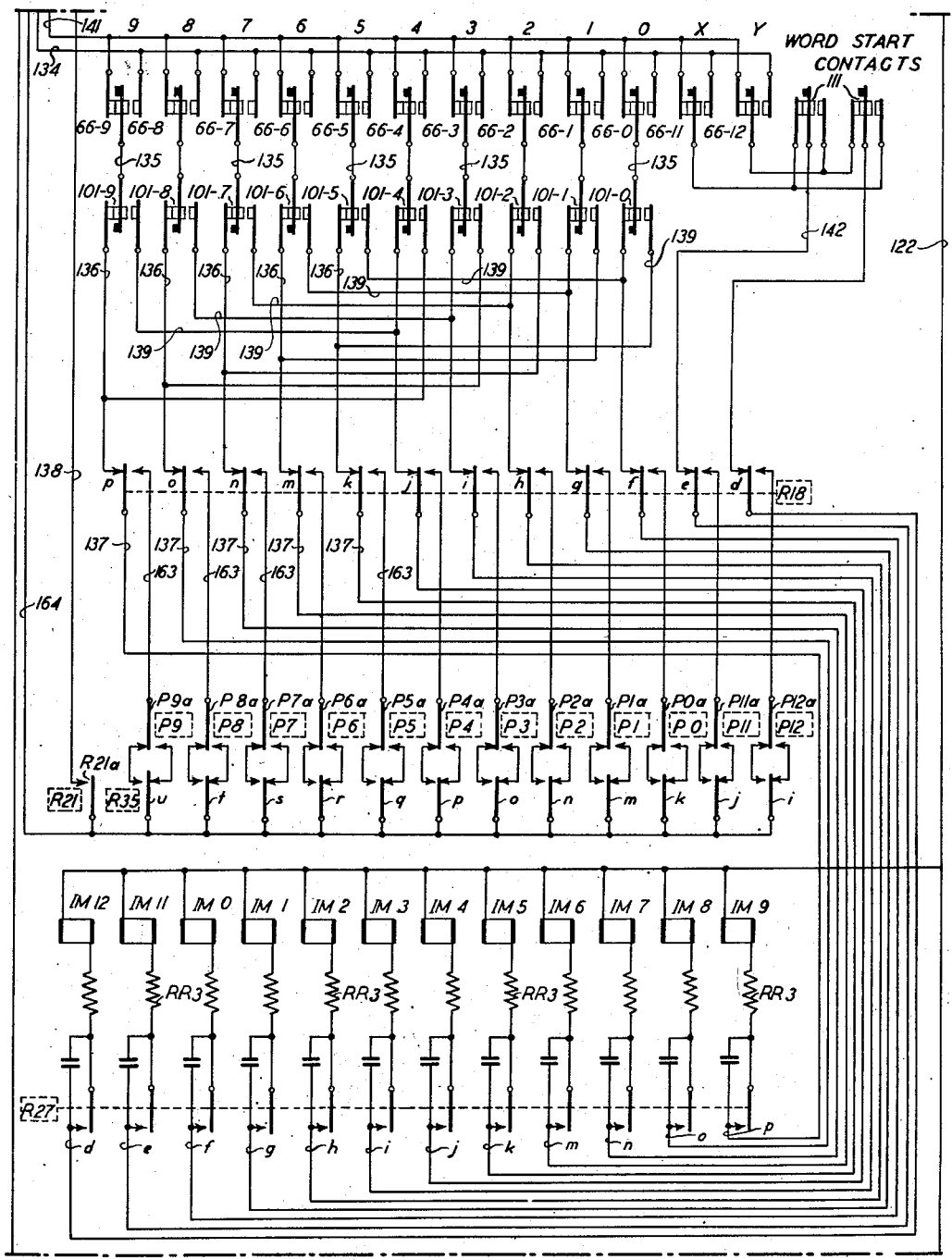
Figure 33C:
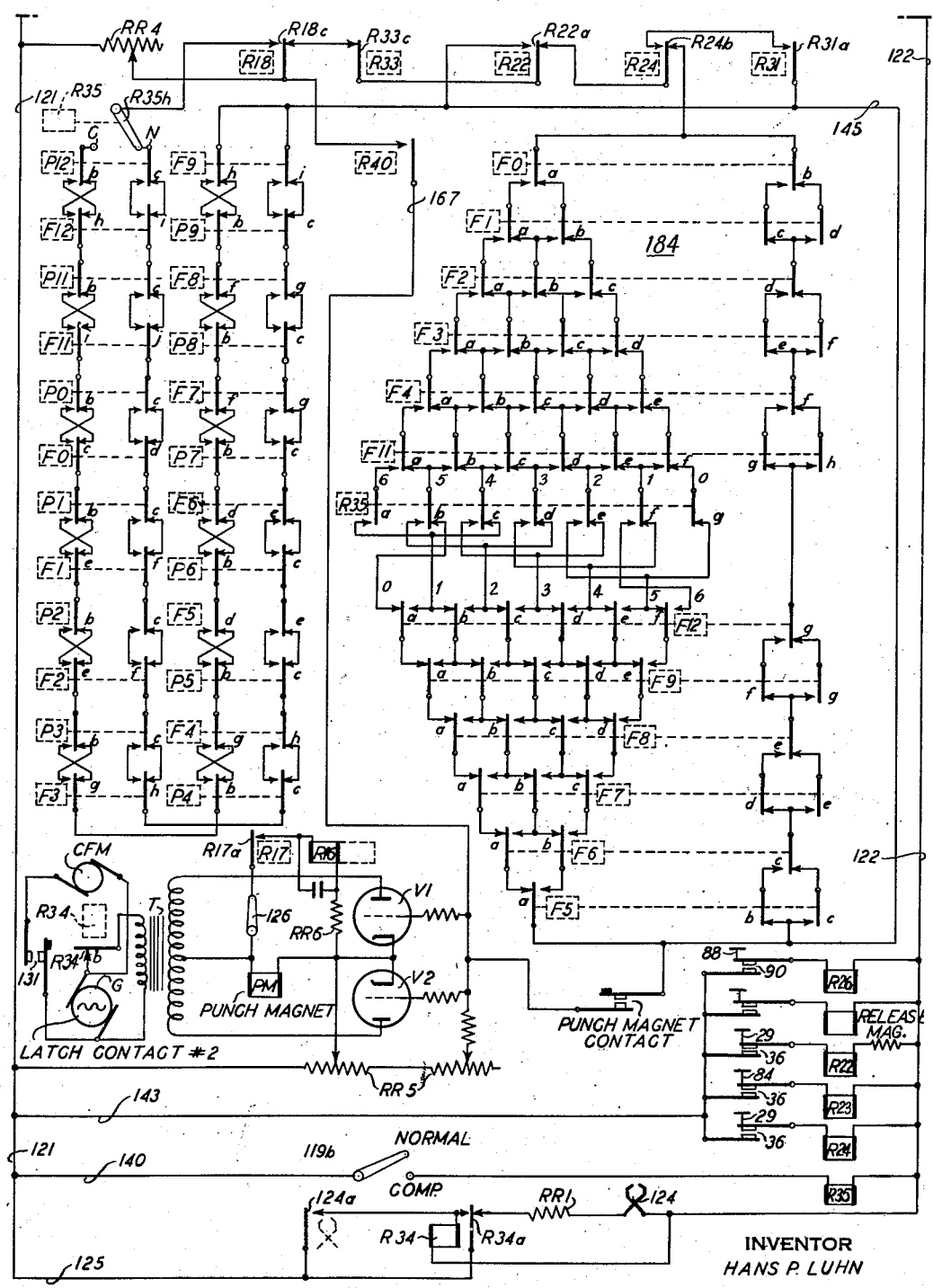

For this operation the switches 119a (Fig. 33a) and 119b (Fig. 33c) are set in the position N, and since the coding arrangements of series A2 constitutes a transposition of the coding arrangements of series A1, the shift key 92 is depressed and locked in position by the shift key lock 93 thereby unlatching the contacts 101—9, 101—8, 101—7 ... 101—0 (Figs. 4 and 33b).

As in the case of series A1 previously discussed, the "A" code selector key 29 is depressed and locked in position, and the "A" key 20 is depressed which will result in the contacts 66—9, 66—8, 66—7, 66—6 and 66—5, in addition to contacts 80 to be unlatched. It is to be noted that the same contacts have been unlatched as were unlatched for the letter "a" as represented by series A1.

The unlatching of the contacts 66—9, 66—8, 66—7, 66—6 and 66—5 will cause a circuit to be established through each set of contacts whereby the respective interposer magnets IM4, IM3, IM2, IM1, and IM0 will be energized. The circuit whereby the interposer magnet IM4 is energized is traceable from line 121, latch contacts 130 now closed, line 138, contacts R25a now closed, contacts R24a and contacts R23c normally closed, position N of the switch 119a, line 134, contacts 66—9 (Fig. 33b) shifted, contacts 101—9 shifted, line 135, line 136, contacts R18j normally closed, line 137, contacts 27j now closed, resistor RR3, interposer magnet IM4 to the line 122. In like manner the circuits may be traced for the remaining magnets IM3, IM2, IM1 and IM0.

Upon being energized, the magnets IM4, IM3, IM2, IM1 and IM0 will respectively close the contacts IM4a, IM3a, IM2a, IM1a and IM0a (Fig. 33a) in addition to closing the contacts PMa (Fig. 33c) thereby causing the respective follower relays F4, F3, F1 and F0 to be energized and the contacts associated therewith to be closed in a manner as previously described. The punch magnet PM will then be energized resulting in the "4," "3," "2," "1," and "0" index point positions being punched in a detail card such as that punched in column 1 of the detail card of Fig. 26.

Punching of series B1

To punch any combination of this series within a detail card, it is necessary that the switch 119a (Fig. 33a) be in the normal position N and that the "B" code selector key 29 be depressed and locked in position. Upon depressing the "B" key 29, the spring 43 (Fig. 7) will drive the shaft 41 which, in turn, will cause the cylinder 67 to be positioned to indicate the rows of keys 20 to be used in setting up the characters of the code series B. From Fig. 12, it will be noted that the upper row of keys 20 will be used for the units digits while the next lower row will be used to punch the tens digits of Code Series B. Likewise when the "B" key 29 is depressed, the carriage end frame will be moved horizontally to position the contact bails 60 secured thereto so as to be properly engaged upon depressing any of the keys 20 of the upper two rows.

Assuming it is desired that the two digit number 00 be punched within a column of the detail card, it is necessary that the key 20 bearing the marking "0" on the front face thereof in the units digit row be depressed with the key 20 bearing the marking "0" on the front face also in the tens digit row. The depressing of these keys 20 will unlatch the contacts 66—7, 66—6, 66—5, 66—1 and 66—0 in addition to the common bail contacts 80. The unlatching of the contacts 66—7, 66—6, 66—5, 66—1 and 66—0 will cause a circuit to be established in a manner previously described so as to result in the interposer magnets IM7, IM6, IM5, IM1 and IM0 being energized and the associated contacts IM7a, IM6a, IM5a, IM1a and IM0a being closed.

The closing of the interposer contacts will cause the corresponding follower relays to be energized and the conditioning circuit to be set up whereby the punch magnet PM becomes energized and the index positions "7," "6," "5," "1," and "0" perforated such as shown in column 2 of the detail card of Fig. 26.

It is to be noted for a punching operation within Code B that it is necessary that two of the keys 20 be depressed in order to energize the punch magnet PM. For example, in the punching operation just discussed, if only the key 20 in the units row was depressed then only the contacts 66—1 and 66—0 would be unlatched in addition to the bail contacts 80. The unlatching of contacts 66—1 and 66—0 would cause the interposer magnets IM1 and IM0 to be energized resulting in the closing of the contacts IM1a and IM0a and the resulting energization of the corresponding follower relays F0 and F1 and the shifting of the associated contacts F0a, F1a and F1b.

Then when a pulse is delivered to the conditioning circuit it would be found that due to an insufficient number of energized interposer magnets that an opening circuit occurs at contacts F7c thereby preventing the punch magnet PM from being energized when only a single key 20 is depressed for a punching operation of the characters represented by Code B.

Complementary punching

In the detail card of Fig. 26 there is shown in column 2 thereof the two digit number 00 punched pursuant to the code notations of series B1. In order that this combination of perforations be matched, it is necessary that the master card of Fig. 27 be punched in a complementary fashion when it is in the machine.

The keyboard is initially conditioned for a complementary punching operation by shifting the switches 119a (Fig. 33a) and 119b (Fig. 33c) from the normal position N to the complementary position C, by depressing the "B" key 29, and by depressing the "0" keys 20 in the upper two rows.

The closing of the switch 119b completes a circuit to energize the relay R35 (Fig. 33c) and resulting in the contacts R35a to R35g in the conditioning circuit being closed. This circuit is traceable from line 121, line 140, C position of switch 119b, relay R35 to the line 122.

The depressing of the "B" key 29 and the "0" keys 20 in the top two rows causes the contacts 66—7, 66—6, 66—5, 66—1 and 66—0 to be unlatched. The shifting of the switch 119a (Fig. 33a) to the "C" contacts position, in conjunction with the depressing of the proper keys 20 and 29, establishes a circuit to energize the interposer magnets IM9, IM8, IM4, IM3, IM2, IM11 and IM12. The circuit to energize the interposer magnet IM9 is traceable from line 121, latch contacts 130, contacts R25a now closed, contacts R24a and R23c normally closed, C position of switch 119a, line 141, contacts 66—9 (Fig. 33b) as shown, line 135, contacts 101—9 as shown, line 136, contacts R18p as shown, line 137, contacts 27p now closed, resistor RR3, interposer magnet IM9 to the line 122. In a similar manner the interposer magnets IM8, IM4, IM3, IM2, IM11 and IM12 will be energized and the associated contacts closed. It is to be noted that unlatching the contacts 66—7, 66—6, 66—5, 66—1, and 66—0 prevents a circuit being made to the corresponding interposer magnet.

The closing of the interposer contacts IM9a, IM8a, IM4a, IM3a, IM2a, IM11a, and IM12a (Fig. 33a) completes a circuit causing each of the corresponding relays F9, F8, F4, F3, F2, F11 and F12 to be energized and the contacts associated therewith forming the conditioning circuit to be shifted.

A circuit will then be established through the conditioning circuit which will cause the punch magnet PM to be energized and the index point positions "9," "8," "4," "3," "2," "X," and "Y" to be perforated such as shown in column 61 of the master card of Fig. 27. This circuit is traceable from line 121, potentiometer RR4 (Fig. 33c), contacts R18c, R33c, R22a and R22b normally closed, contacts F0a and F1b as shown, contacts F2c, F3c, F4c, F11c, R35c, F12c, F9b, and and F8a, all shifted, contacts F7a, F6a and F5a all as shown, contacts PMa now closed, to the control grid of the tubes V1 and V2 whereby one of the tubes is made conducting thereby causing the magnet PM to be energized.

It should be noted that by energizing the relay R35 by closing the switch 119b, the conditioning circuit is set up such that the punch magnet will only be energized when seven interposer contacts have been closed. It is recalled that for normal punching the punch magnet will be energized only when five interposer contacts have been closed.

Word start punching

As previously pointed out, in the Major series the presence of a hole in the X index point position and the absence of a hole in the Y index point position identifies the character represented as one constituting the beginning of a word, term or expression. Also that upon depressing any of the code selector keys 29 associated with the Major series, the contact bails 60 will be so positioned as to normally cause the Y index point position contacts 66—12 to be unlatched whenever one of the keys 20 is depressed thereby resulting in the Y index position being perforated. It is believed to be pertinent at this time to state that for the Minor series the X and Y index point contacts 66—11 and 66—12 will both be unlatched upon depressing one or two of the keys 20 as the case may be whenever one of the code selector keys 29 associated with the minor series is in a depressed position.

Now when it is desired to represent a character signifying the start of a word or expression within a card, the operator will after depressing the proper code selector key 29 depress the word start key 98 (Fig. 1) which will, in turn, cause the unlatching of the word start contacts 111 (Figs. 4 and 33b). Then upon depressing one of the keys 20 five of the contacts 66 will be unlatched where one of the five contacts will be contacts 66—12. The unlatching of the contacts 66—12 in conjunction with the unlatching of the word start contacts will result in the X index point position of a detail card being perforated. The circuit enabling this operation to be performed is traceable from line 121, latch contacts 130 now closed, line 138, contacts R25a now closed, contacts R24a and R23c normally closed, position N of switch 119a, line 134, contacts 66—12 (Fig. 33b) shifted, left hand set of contacts 111 now closed, line 142, contacts R18e normally closed, contacts R27e now closed, resistor RR3, interposer magnet IM11 to the line 122. The energizing of the interposer magnet IM11 will in addition to the four other magnets IM set up the conditioning circuit whereby the punch magnet will be energized and the record card perforated in a manner to indicate the start of a word or expression.

It is to be noted that in this operation that the contacts 66—12 of the Y index point position will always be unlatched for a Major series operation; that the unlatching of the word start contacts 111 condition the contacts 66—12 to enable the word start representation in the form of an X perforation to be punched in a card; and that the word start key is only used with the Major series.

Column 6 of the record card of Fig. 26 shows a character represented within the card and signifying the start of a word or expression.

Tabular notation punching

In the tubular notation system of representation a single concept is represented by the presence of a single hole within a column of a defined field in a detail card. This system is not restricted to the number of holes permitted in any one column.

To punch a table of this sort, the indexer will refer to a table index chart such as the one shown in Fig. 29 and assuming that the operator desires to represent the locations California and Florida in a complementary fashion in column 1 of a detail card, the following operations will take place.

The operator will depress the Tabular "T" code selector key 87 (Fig. 1) in order to condition the keyboard for a tabular notation punching operation. Upon depressing the "T" selector key 87 a previously held selector key 29 will be released and the "T" selector key 87 will be locked in position. After assuming the locked position the "T" key 87 will cause the drum 67 to be positioned so as to indicate that the top row of the keys 20 will be used in punching the table within a detail card. Depressing the "T" key 87 will also cause the associated contacts 36 to be closed thereby completing a circuit for energizing the relay R24 (Fig. 33c) and shifting the associated contacts R24a and R24b. This circuit is traceable from line 121, line 143, "T" contacts 36 now closed, relay R24 to the line 122.

The operator upon noting that California and Florida respectively occupy index point positions "3" and "8" in the index card will then depress the corresponding keys 20 in the top row. This will cause the contacts 66—3 and 66—8 (Fig. 33b) to be unlatched. Since the table is to be punched in a complementary fashion, the operator will also depress the "X" index point key 20 in the top row in order that after the punching operation has taken place a card may be readily identified as being complementarily punched due to the absence of the "X" hole. The depressing of the "X" key 20 will unlatch the contacts 66—11.

After the contacts 66—3, 66—8 and 66—11 have been unlatched, the key 89 (Fig. 1) will be depressed which will enable a circuit to be set up which will energize the punch magnet PM causing the complementary positions to be perforated within a card.

Depressing the key 89 will cause the contacts 91 associated therewith to be closed thereby establishing a circuit for energizing the relay R32 (Fig. 33a) and closing the associated contacts R32a and R32b. This circuit is traceable from line 121, latch contacts 130 now closed, line 138, line 144, contacts 91 now closed, relay R32 to the line 122. The closing of the contacts R32b will complete a circuit for the relay R31 (Fig. 33a) whereby the relay becomes energized and the contacts R31a closed. This circuit may be traced from line 121, latch contacts 130, contacts R25a now closed, contacts R24a now shifted, contacts R32a and R32b now closed, relay R31 to the line 122.

The circuit when key 89 is depressed may be traced from line 121, latch contacts 130, contacts R25a now closed, R24a now shifted due to the relay R24 being energized when the "T" key 87 was depressed, contacts R32a now closed due to the relay R32 being energized when the key 89 was depressed, line 141, the latched contacts 66—9, 66—7, 66—6, 66—5, 66—4, 66—2, 66—1, 66—0 and 66—12 (Fig. 33b), the corresponding contacts R18p, R18n, R18m, R18k, R18j, R18h, R18g, R18f, and R18d, the corrresponding lines 137, corresponding contacts R27p, R27n, R27m, R27k, R27j, R27h, R27g, R27f, and R27d, the corresponding interposer magnets IM9, IM7, IM6, IM5, IM4, IM2, IM1, IM0, and IM12 to the line 122 whereby the interposer magnets are energized and the associated contacts closed.

After the interposer magnets are energized causing the closing of the associated interposer contacts and the punch magnet contacts PMa, the remaining part of the circuit may be traced from line 121 (Fig. 33c), potentiometer RR4, contacts R18c, R33c, R22a all normally closed, contacts R24b shifted, contacts R31a now closed, line 145, contacts PMa now closed to the grids of the tubes V1 and V2 whereby one of the tubes will be made conductive thereby causing the punch magnet to be operated.

It is to be noted that the energizing of the relay R31 set up a circuit by-passing the conditioning circuit and enabling the punch magnet PM to be energized whenever any number of interposer contacts are closed.

The detail card of Fig. 30 shows in column 1 thereof the locations California and Florida represented in a complementary fashion.

The master card to be used in searching for data in the detail card of Fig. 30 is shown in Fig. 31. The master card is punched normally such that all the wanted data is punched. Now assuming it is desired to represent the geographical location of California within a master card, the operator will first depress the "T" selector key 87 (Fig. 1) which will condition the keyboard for a tabular punching operation.

As previously explained, depressing the "T" key 87 will close the associated contacts 36 causing the energization of the relay R24 and the closing of the contacts R24a and R24b.

The next step by the operator is to depress the "3" and the "X" key 20 which will unlatch the contacts 66—3 and 66—11 (Fig. 33b). Then since it is desired that the information be normally punched in the record card, the operator will depress the key 88 causing the contacts 90 to be closed and resulting in a circuit being established for energizing the relay R26 (Fig. 33c) and closing the associated contacts R26a and R26b (Fig. 33a). This circuit may be traced from line 121, line 143, contacts 90 now closed, relay R26 to the line 122.

The depressing of the key 88 will enable a circuit to be established to energize the punch magnet PM and cause the "3" and the "X" index point positions in a card to be perforated.

This circuit may be traced from line 121, latch contacts 130, now closed, line 138, contacts R25a now closed, contacts R24a shifted, contacts R26a now closed, line 134, contacts 66—3 and 66—11 (Fig. 33b), corresponding contacts R18i and R18e as shown, corresponding contacts R27i and R27e, corresponding interposer magnets IM3 and IM11 to the line 122 whereby the interposer magnets become energized and the associated contacts closed. At the same time that this circuit is established a parallel circuit is set up which causes the relay R31 (Fig. 33a) to be energized and the associated contacts R31a. This circuit may be traced from line 121, contacts 130, line 138, contacts 25a now closed, contacts 24a shifted, contacts R26a and R26b now closed, relay R31 to the line 122.

After the interposer magnets IM3 and IM11 have been energized, the circuit is completed from line 121 (Fig. 33c), potentiometer RR4, contacts R18c, R33c and R22a all normally closed, contacts R24b shifted, contacts R31a now closed, line 145, contacts PMa now closed to the grids of the tubes V1 and V2 whereby one of the tubes is rendered conducting and the punch magnet PM energized.

Figure 31 shows in column 1 of a master card the index point positions "3" and "X" perforated.

*Lacing*

In order to prevent the detail cards from causing an unwanted matching condition when being compared with a master card, the unused columns of the detail cards containing data punched normally therein are punched or laced with six holes to each unused column commencing with the top hole of the first unused column being punched in the "X" index position and thereafter alternating with the top hole being punched in the "Y" index point position. An example of a detail card laced in the unused columns 22–80 is shown in Fig. 26.

A lacing operation is initiated by depressing the lace key 84 which upon being depressed is locked in position and releases a previously locked selector key 29. The depressing of the lace key 84 (Fig. 6) closes the associated contacts 36 causing the relay R23 (Fig. 33c) to be energized and the associated contacts R23a to R23e to be opened or closed as the case may be. This circuit may be traced from line 121, line 143, contacts 36 now closed of the lace key 84, relay R23 to the line 122.

The depressing of the key 84 also causes the lug 85 (Fig. 6) to operate the lace key bail 86 which in turn engages the six required bails 60 causing the unlatching of all the odd contacts 66—9, 66—7, 66—5, 66—3, 66—1 and 66—11 (Fig. 33b).

The unlatching of the odd contacts enables a circuit to be completed whereby the punch magnet PM is energized causing the odd index point positions in the first unused column of a detail card to be perforated.

The particular circuit is traceable from line 121, latch contacts 130 now closed, contacts R25a now closed, contacts R24a normally closed, contacts R23c shifted due to the relay R23 being energized when the lace key was depressed, R20c normally closed, line 146, common contact 147 of the switch S1 to be described subsequently, wiping arm 148 of S1, odd numbered segments of S1 coupled together, line 149, contacts R23d now closed, contacts R35u as shown, line 134, unlatched contacts 66—9, 66—7, 66—5, 66—3, 66—1 and 66—11 (Fig. 33b), line 135, contacts 101—9, 101—7, 101—5, 101—3, 101—1 and 101—11 all as shown, corresponding line 136, contacts R18p, R18n, R18k, R18i, R18g and R18e, corresponding line 137, respective contacts R27p, R27n, R27k, R27i, R27g and R27e, corresponding resistor RR3 interposer magnets IM9, IM7, IM5, IM3, IM1 and IM11 to the line 122 whereby the interposer magnets are energized and the respective contacts IM9a, IM7a, IM5a, IM3a, IM1a and IM11a in addition to the punch magnet contacts PMa are closed.

As a result of the closing of the interposer contacts the respective follower relays F9, F7, F5, F3, F1 and F11 are energized thereby causing the shifting of the contacts associated therewith.

The energizing of the respective follower relays sets up a circuit which causes a positive pulse to be delivered to the control grids of the tubes V1 and V2 thereby rendering one of said tubes conductive and causing the punch magnet to be energized. This circuit is traceable from line 121 (Fig. 33c), potentiometer RR4, contacts R18c, R33c, R22a and R24b all normally closed, contacts F0b as shown, F1d now closed, F2d as shown, F3f now closed, F4f as shown, F11h now closed, F12g as shown, F9g now closed, F8e as shown, F7e now closed, F6c as shown, F5c now closed, contacts PMa now closed to the control grids of the tubes V1 and V2 whereby one of the tubes is made conducting and the punch magnet PM energized causing the "9," "7," "5," "3," "1," and "X" index point positions to be punched within a column.

At the completion of the punch stroke the escapement mechanism will be made effective and the rack and card carriage will advance one tooth so as to position the detail card for a punching operation in the next column of the card in a manner such as described in Patent No. 2,424,097. At the same time the floating cam contacts 132 (Fig. 33a) are opened thereby dropping out the relay R27 and opening the circuits to the respective interposer magnets IM9, IM7, IM5, IM3, IM1, and IM11. When the relay R27 is deenergized, the contacts R27a are opened thereby causing the relay R25 to be deenergized which, in turn, opens the contacts R25a.

When the contacts R25a are opened, the circuit established for the energizing of the stepping switch coil R41 is broken thereby deenergizing the coil R41. When the circuit to the coil R41 is broken by the opening of the contacts R25a, a pawl, not shown, will be retracted by a spring so as to turn a ratchet wheel, not shown, secured to the common shaft of the three switches S1, S2, and S3 a single step whereby the respective wiping arms 148, 151 and 152 will contact the next set of contacts in a manner well understood in the art.

It is to be noted that the reset solenoid 82 is not effective during a lacing operation inasmuch as the contacts R23b (Fig. 33a) being opened due to the lacing relay R23 being energized prevents a circuit from being established for energizing the reset solenoid.

When the floating cam contacts 132 close again and with the lace key 84 in a depressed position, a circuit will be completed through the switch S2 whereby the even numbered index points will be punched in the next following column of the detail card. Upon assuming the closed position, the floating cam contacts 132 (Fig. 33a) will enable a circuit to be established to energize the relay R27 which through the contacts associated therewith will, in turn, enable the relay R25 to be energized.

Upon being energized, the relay R25 will cause the contacts R25a to be closed which will establish a circuit for the energizing of the even numbered interposer magnets IM. This circuit is traceable from line 121, latch contacts 130, line 138, contacts R25a now closed, contacts R24a normally closed, contacts R23c shifted, contacts R20c normally closed, line 146, common contact 150 of switch S2, wiper 151, even numbered segments of S2 coupled together, line 153, contacts R32e now closed, contacts R35v as shown, line 141, latched contacts 66—8, 66—6, 66—4, 66—2, 66—0 and 66—12 (Fig. 33b), corresponding contacts R18o, R18m, R18j, R18h, R18f, and R18d, all as shown, corresponding lines 137, respective contacts R27o, R27m, R27j, R27h, R27f, and R27d all now closed, respective interposer magnets IM8, IM6, IM4, IM2, IM1, and IM12 to the line 122 whereby the interposer magnets are energized and the corresponding contacts closed. Upon being closed the interposer contacts will set up a circuit for the energization of the respective follower relays F8, F6, F4, F2, F0 and F12 in a manner as previously described.

After the follower relays are energized, a circuit will be established for rendering one of the tubes V1 or V2 conductive thereby energizing the punch magnet PM. This circuit may be traced from line 121 (Fig. 33c), potentiometer RR4, contacts R18c, R33c, R22a and R24b all as shown, contacts F0b shifted, F1c as shown, F2d shifted, F3e as shown, F4f shifted, F11g as shown, F12g shifted, F9f as shown, F8e shifted, F7d as shown, F6c shifted, F5b as shown, contacts PMa now closed to the control grids of the tubes V1 and V2.

Upon being energized the punch magnet will cause the index point positions "8," "6," "4," "2," "0," and "Y" to be punched within the second unused column of the record card such as shown in column 23 of the detail card of Fig. 26.

This lacing operation is alternately continued through the functioning of the stepping switch to column 80. After lacing column 80 the eject relay R16 (Fig. 33c) is picked up in a manner previously described causing the closing of the contacts R16b and the resultant energization of the relay R20 and the closing of the contacts R20a and R20b (Fig. 33a). When the contacts R20a are closed a circuit is established for the energizing of the reset solenoid 82 resulting in the relatching of all unlatched contacts. This circuit is traceable as follows: line 121, line 156 (Fig. 33a), contacts R23a now closed, contacts R20a now closed, line 157, reset solenoid 82 to the line 122.

The relay R20 is held energized until a newly depressed selector key 29 unlocks the lace selector key 84 dropping out the relay R23 and breaking the hold circuit for R20.

Also after lacing column 80, the switch coil R41 is deenergized resulting in the wipers 148, 151 and 152 being moved to the next contact. Now it is desired that the wiping arms of the stepping switch be in a position such that for a subsequent lacing operation in a different card that the wipers be in contact with the odd numbered segments of S1, S2, and S3 to thereby enable the odd numbered index positions in the first unused column to be punched.

If the wiping arms are in engagement with the even numbered segments, a circuit will be established which will energize the coil R41 causing the contacts R41a to open thereby deenergizing the coil R41 and resulting in the wipers being moved to the next contact which is an odd numbered contact. This circuit is traceable from line 121, line 156, contacts R23a (Fig. 33a) now closed since the lace key 84 is still depressed, contacts R20b now closed, line 155, even numbered segments of homing switch S3, wiper 152, common contacts of switch S3, contacts R41a normally closed when coil R41 is deenergized, coil R41 to the line 121 whereby the coil R41 is energized.

Upon being energized, the coil R41 causes the contacts R41a to open thereby breaking the circuit to the coil R41 and deenergizing it. After the coil R41 is deenergized, the wipers 148, 151 and 152 are moved to the next segment in a manner as previously described.

The stepping switch comprises three commutators S1, S2 and S3 each having a set of 20 contacts in addition to a common contact. The odd numbered contacts of the commutator S1 are coupled to each other while the even numbered contacts of the commutators S2 and S3 are coupled to each other. The common contacts of S1 and S2 are each coupled to the line 146 while the common contacts of S3 are coupled through the contacts R41a to the line 146.

The wiping arms of each of the commutators are mounted on the same shaft, not shown, and therefore always rotate in unison. Attached to the wiper shaft is a ratchet, not shown, which will be energized by a spring biased pawl, not shown, connected to the armature of the coil R41. When the circuit to the coil R41 is broken, the pawl will be retracted by a spring so as to turn the ratchet wheel and the shaft a single step.

Duplication

In this operation, data contained within one card may be reproduced in a second card. The keyboard is initially conditioned for operation in a manner as previously described resulting in the relays R25 and R27 being energized and the associated contacts closed, and the latch contacts closed.

After the card to be duplicated is positioned within the machine, the well-known contacts 158 (Fig. 33a) (contacts 109 in Patent No. 2,424,097) are closed enabling a circuit to be established for energizing the relay R18 and resulting in the closing of the contact R18a. This circuit is traceable from line 121, latch contacts 130, line 138, contacts R17b normally closed, contacts 158, cut out contacts 159 normally closed, relay R18 to the line 122. After the contacts R18a are closed, the brush magnet BM (Fig. 33a) is energized causing the brushes 160 (Fig. 33a) to be positioned for a duplicating operation. Likewise upon being energized, the brush magnet BM closes the contacts BMc which establishes an obvious circuit for the relay R39 (Fig. 33a) thereby enabling the relay R39 to be energized and the contacts R39a closed.

Now assuming that a card punched in the "9," "8," "7," "6," and "5" index point positions is to be duplicated, the following circuits will be set up when the respective brushes 160 detect the presence of these perforations in the card: line 121, latch contacts 130 now closed, contacts R17c (Fig. 33c) normally closed, contacts R27a now closed, contacts R18b shifted, common brush 161, contact roll 162, perforated index points "9," "8," "7," "6," and "5," corresponding brushes 160, pilot relays P9, P8, P7, P6, and P5 to the line 122 whereby the pilot relays are energized and the associated contacts shifted.

At the same time a parallel circuit is established from the shifted contacts R18b through the now closed contacts, contacts R39a, the relay R21 to the line 122 whereby the relay R21 (Fig. 33a) is energized and the contacts R21a (Fig. 33b) closed. The closing of the contacts R21a sets up the circuits which will energize the interposer magnets and close the associated contacts thereof. This circuit is traceable from line 121, latch contacts 130, line 138, contacts R21a (Fig. 33b) now closed, the contacts R35u, R35t, R35s, R35r, and R35q as shown, respective contacts P9a, P8a, P7a, P6a, and P5a all shifted, corresponding lines 163, respective contacts R18p, R18o, R18n, R18m, and R18k all shifted, corresponding lines 137, respective contacts R27p, R27o, R27n, R27m, and R27k all now closed, respective resistors RR3, corresponding interposer magnets IM9, IM8, IM7, IM6, and IM5 to the line 122 whereby the respective interposer magnets are energized and the associated contacts are closed.

After the respective interposer contacts IM9a, IM8a, IM7a, IM6a, and IM5a (Fig. 33a) have been closed, the corresponding follower relays F9, F8, F7, F6, and F5 are energized and the associated contacts are shifted in a manner as previously described.

After the respective follower and pilot relays have been energized, a punch magnet conditioning circuit consisting of intercoupled contacts of the two sets of relays will be set up whereby a positive pulse will be applied to the control grids of the tubes V1 and V2 thereby rendering one of the tubes conducting and resulting in the punch magnet PM being energized. This conditioning circuit is traceable from line 121, potentiometer RR4, contacts R18c (Fig. 33b) shifted, contacts R35h as shown, contacts P12c, F12i, P11c, F11j, P8c, F8d, P1c, F1f, P2c, F2j, P3c, F3h, P4c, and F4h all as shown shifted contacts P5c, F5e, P6c, F6e, P7c, F7g, P8c, F8g, P9c, and F9i, contacts PMa to the control grids of V1 and V2 thereby rendering one of the two tubes conductive and energizing the punch magnet PM resulting in the index points "9," "8," "7," "6," and "5" being punched in a detail card.

It is also possible to duplicate a card in complement. In this situation the switches 119a and 119b are shifted and the relay R35 is energized and the associated contacts are shifted.

Now assuming that the detail card of Fig. 26 is being duplicated in complement and that the brushes 160 (Fig. 33a) have detected the presence of the perforations in the "6," "4," "0," "X" and "Y" index point positions in column 17, the respective pilot relays P6, P4, P0, P11 and P12 (Fig. 33a) will be energized and the corresponding contacts P6a, P4a, P0a, P11a, and P12a shifted.

After the pilot relay contacts and the associated contacts of R35 have been shifted the circuits to the interposer magnets IM6, IM4, IM0, IM11 and IM12 will be opened while the circuits for the remaining interposer magnets will be closed resulting in the energization of the interposer magnets IM9, IM8, IM7, IM5, IM3, IM2, and IM1 and the closing of the corresponding interposer magnet contacts.

With the closing of the interposer magnet contacts IM9a, IM8a, IM7a, IM5a, IM3a, IM2a, and IM1a, the follower relays F9, F8, F7, F5, F3, F2, and F1 will be energized and the respective contacts thereof shifted.

With the contacts of the pilot relays and the follower relays now in a shifted position, a circuit will be established which will apply a positive pulse to the control grids of one of the tubes V1 and V2 rendering one of the tubes conducting and resulting in the energization of the punch magnet PM. This circuit is traceable from line 121 (Fig. 33c), potentiometer RR4, contacts R18c shifted, contacts R35h shifted to contact position "C," contacts P12b shifted, F12h as shown, P11b shifted, F11i as shown, P0b shifted, F0c as shown, P1b as shown, F1e shifted, P2b as shown, F2e shifted, P3b as shown, F3g shifted, P4b shifted, F4g as shown, P5b as shown, F5d shifted, P6b shifted, F6d as shown, P7b as shown, F7 shifted, P8b as shown, F8f shifted, P9b as shown, F9h shifted, line 145, punch magnet contacts PMa, to the control grids of the tubes V1 and V2.

Column 48 of the master card of Fig. 28 shows in complement form the character represented in column 17 of the detail card of Fig. 26 which may be done by duplicating in a complementary fashion.

*Standard punching*

For this operation the key 29 marked "STD" (Fig. 1) is depressed resulting in the drum 67 being positioned to indicate the keys 20 to be used for this operation as well as releasing the key 29 last depressed. Depressing the standard (STD) key 29 closes the associated contacts 36 causing the relay R22 (Fig. 33c) to be energized and the corresponding contacts R22a, R22b, and R22c to be closed.

As in the case of the previous punching operations, the depressing of a key 20, for example the "9" key 20, will result in the unlatching of the contacts 66—9, and the energization of the relays R25 and R27.

In turn the interposer magnet IM9 will be energized resulting in the energization of the punch magnet PM. It is to be noted that for a standard punching operation, the punch magnet conditioning circuit is bypassed by the contacts R22a (Fig. 33c) shifted due to the relay R22 being energized.

In order to duplicate a card bearing data pursuant to the standard punching arrangement, the contacts 158 (Fig. 33a) are closed and the "STD" key 29 is depressed resulting in the relays R18, R25, R27, and R39, and the brush magnet BM being energized in a manner similar to that previously described.

Now assuming a "9" is sensed in the card to be duplicated, the pilot relay P9 (Fig. 33a) will be energized and at the same time the relay R21 will be energized and the contacts R21a closed resulting in the interposer magnet IM9 being energized.

Upon being energized, the interposer magnet IM9 will cause the contacts IM9a and PMa to be closed. The closing of the contacts IM9a will result in the energizing of the follower relay F9 and the shifting of the associated contacts.

The punch magnet will then be energized through a circuit which is traceable as follows: line 121 (Fig. 33c), potentiometer RR4, contacts R18c shifted, contacts R35h as shown, contacts P12c, F12i, P11c, F11j, P0c, F0d, P1c, F1f, P2c, F2f, P3c, F3h, P4c, F4h, P5c, F5e, P6c, F6e, P7c, F7g, P8c, and F8g all as shown, P9c shifted, F9i shifted, line 145, contacts PMa now closed, to the control grids of the tubes V1 and V2 whereby one of the tubes is energized resulting in the energization of the punch magnet PM.

If no hole is sensed in a column, a circuit will be established which will cause the machine to automatically space over the unpunched column by energizing the punch magnet PM when no interposer magnets are energized. This circuit is traceable from line 121, contacts 130 (Fig. 33a) now closed, line 138, contacts R21a (Fig. 33b) now closed, line 164, contacts R22c (Fig. 33a) now closed, contacts P9d, P8d, P7d, P6d, P5d, P4d, P3d, P1d, P0d, P12d, and P11d normally closed, line 165, contacts R18r and R39b now closed, auto-space switch 166 in a closed position, resistor RR7, and relay R40 to the line 122.

Upon being energized the relay R40 will cause the contacts R40a (Fig. 33c) to be closed thereby setting up a circuit to apply a positive pulse to overcome the negative grid bias of the tubes V1 and V2. This circuit may be traced from line 121 (Fig. 33c), potentiometer RR4, contacts R40a now closed, line 117, to the control grids of V1 and V2 causing one of the tubes to be made conducting resulting in the energization of the punch magnet PM.

Normal spacing in any operation can take place by depressing the space key 95 (Figs. 1 and 33a) which will cause the relay R40 to be energized thereby resulting in the punch magnet PM being energized in a manner as previously mentioned.

*Skipping*

In the coding arrangements set forth in Figs. 13 to 25 it is not intended to have any skipping operation take place inasmuch as for the proper operation of the scanning apparatus all detail cards are to have holes punched in all columns. In a standard punching operation, skipping of columns may take place.

The skipping of columns will take place, whenever the skip magnet SM (Fig. 33a) is energized and the proper skip bar, not shown, is in the rack. The skip magnet SM is energized by depressing the skip key 96 (Figs. 1 and 33a) which will result in the energization of the skip relay R15 (Fig. 33a) and the making of the associated contacts R15a, R15b, and R15c which, in turn through the contacts R15a sets up a circuit for energizing the skip magnet SM. This circuit is traced as follows: line 121, latch contacts 130 now closed, line 138, contacts R17b as shown, contacts R14a normally closed, contacts R15a now closed, skip magnet SM to the line 122.

At the same time that the skip magnet is energized a circuit is established for energizing the punch magnet PM. This circuit is traceable from line 121, contacts 130 now closed, line 138, contacts R17b normally closed, contacts R14a normally closed, contacts R15b now closed, line 168, resistor RR7, relay R40 to the line 122 whereby the relay R40 is energized and the contacts R40a (Fig. 33c) closed resulting in the punch magnet PM being energized in a manner as previously described.

After the punch magnet is energized, the floating cam contacts 133 are opened causing the relay R14 to be deenergized and the contacts R14a to be closed. When the skip magnet SM is energized the skip lifter, not shown, will force the dog, not shown, out of the rack teeth, not shown, and retain the floating cam contacts 132 and 133 in an open position. As a result a hold circuit is set up relay R15 which may be traced from line 121, latch contacts 130, line 138, contacts R17b normally closed, contacts R14a closed when R14 is in a deenergized state, contacts R15c now closed, relay R15 to the line 122.

The skip relay R15 and the skip magnet SM are deenergized when the contacts R14a open due to the closing of the floating cam contacts 132 and 133 which enable a circuit to be established for energizing the relay R14. The contacts 132 and 133 are closed when the skip lifter drops to a low level of the skip bar.

*X-skipping*

X-skipping is resorted to for standard punching operations only to avoid repetitious depression of the space key in order to complete card advancing operations after all of the desired information has been punched in a particular field and remaining unpunched columns exist in this particular field.

X-skipping is effected by depressing the "X" key in the top row of the keys 20, see Fig. 12. This will result in the interposer magnet IM11 being energized and the magnet IM11a being closed in a manner as previously described.

The closing of the contacts IM11a (Fig. 33a) will result in the energization of the parallel relays F11 and R13 (Fig. 33a).

The contacts R13a (Fig. 33a) will open when R13 is energized thereby deenergizing the relay R14 and returning the contacts R14a to a closed position.

The contacts R13b (Fig. 33a) will be closed when R13 is energized resulting in a circuit being established for the energization of the skip relay R15. This circuit is traceable from line 121, contacts 130 now closed, contacts R17c normally closed, contacts R27a now closed, contacts R18b as shown, contacts R13b now closed, contacts R22b now closed, contacts F9j, F8h, F7h, F6f, F5f, F4i, F3i, F2g, F1g, F0e, R12j all closed, contacts F11k now closed, line 169, relay R15 to the line 122.

The hold circuit is set up and broken for the skip relay R15 in a manner similar to the normal skipping operation.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A keyboard for conditioning perforating apparatus for a punching operation comprising a first set of keys, permutating key levers adapted to be engaged by each of said keys, a second set of key means, spring biased shaft means having a plurality of projections disposed thereabout, there being one of said projections for each key means of said second set, a plurality of pawl means, there being one of said pawl means for each of said projections, a plurality of contacts, actuating means equal in number and operably associated with said contacts, a slidable supporting frame for said actuating means, said frame being eccentrically coupled to said shaft, means upon depressing one of said key means of said second set for causing said shaft means to rotate, said rotating shaft being brought to a halt when said projection corresponding to said depressed key engages the associated one of said pawl means, said frame means causing said actuating means to assume a different position, means upon depressing one of said keys of said first set for causing the operation of a fixed number of said contacts, interposer magnets equal in number to said contacts and a circuit for energizing the same completed upon the operation of said contacts, a punch, a punch magnet and a conditioning circuit therefor completed only if a fixed and predetermined number of interposer magnets are energized.

2. A keyboard for conditioning perforating apparatus for the punching of different coding systems within a three deck record card comprising code selector means, a plurality of actuating means, said means being adapted to position said actuating means, a plurality of contacts operably associated with said actuating means, key means adapted to engage a predetermined number of said actuating means thereby operating an equal number of said contacts, interposer magnets equal in number to said contacts and a circuit for energizing the same completed upon the functioning of said contacts, said circuit having switch means to complete said circuit for the energization of either the normal or complement number of said magnets, a punch, a punch magnet and a conditioning circuit therefor completed only if either a fixed number or the complement thereof of interposer magnets are energized.

3. In a keyboard, a plurality of keys corresponding to a series of characters, a plurality of key controlled members adapted to assume a different position for different operating conditions, permutating key levers operated upon by the depression of said keys for actuating a fixed number of said members, contact means having a free and a latched position operably coupled to said members, there being one of said contact means for each of said members, said contact means being unlatched by said actuated members, relay means equal in number to said contact means, switching means, a circuit for energizing said relay means, said circuit being completed through said unlatched contact means when said switching means is in one position or being completed through the remaining contact means in a latched position when said switch means is in a second position, a punch, a punch selecting means and a conditioning circuit for operating the same, said conditioning circuit being completed when a first fixed number of said relays are energized with said switching means being in said one position, and completed when the complement of said fixed number of said relays are energized with said switching means being in said second position.

4. A keyboard for conditioning perforating apparatus for perforating in a single column of a record card in accordance with any one of at least three different code combinations comprising a plurality of key means each having dual character markings, a plurality of members positionable according to the type of code combinations to be represented within said column, said members assuming a different and distinct position for each of said code combinations, permutating key levers operated upon by the depression of said keys for actuating a fixed number of said members, contact means equal in number to and operably associated with said members, said contact means being made effective by said fixed number of actuated members, each of said key means causing a different set of contact means being made effective for the various positions of said members, relay means equal in number to said contact means and a circuit for energizing the same completed upon said contact means being made effective, a punch, a punch selecting means and a conditioning circuit for operating the same completed only if a fixed number of said relays are energized.

5. In a keyboard for conditioning perforating apparatus for the punching of hole combinational arrangements of different coding systems representing alphabetical and numerical characters, a plurality of code selector keys there being one for each of said systems, a plurality of movable members controlled by said keys and having a different position for each of said systems as determined by said keys, a plurality of dual character key means arranged in a plurality of rows, indicating means controlled by said code selector keys, said indicating means indicating the row or rows of keys to be depressed for a particular coding system as determined by one of said selector keys being in a depressed position, permutating means operated upon by the depression of said keys as indicated by said indicating means for effecting the further movement of a predetermined number of said members, contact means each having a free and a latched position and equal in number to and operably associated with said members, said contact means being unlatched through the movement of said members, relay means equal in number to said contact means and a circuit for energizing the same completed upon the unlatching of said contact means, a punch, a punch selecting means and a conditioning circuit for operating the same completed only if a fixed number of said relays are energized.

6. In a keyboard for conditioning perforating apparatus for perforating a predetermined number of index positions in every other column of a record card and then the remaining number of index positions in alternate columns of said record card, a plurality of members movable under different operating conditions, a special key means for positioning said members, means operated upon by the depression of said key for actuating a predetermined number of said members, a pair of intercoupled contact means each having a free and a latched position and being equal in number to said members, one of each of said pair of contact means being operably associated with the corresponding one of said members, said one of said contact means being unlatched by said actuated members, relay means equal in number to said contact means and a circuit for energizing the same, cyclically operating stepping switch means alternately completing said circuit through said unlatched contacts of said one of said contact means and through the latched contacts of the other of said contact means, a punch, a punch selecting means and a conditioning circuit for operating the same completed only if a fixed number of said relays is energized in each instance.

7. In a machine having a plurality of punch selecting magnets for punching a given item of data in an upper and a lower deck of a record card, punch operating means, a first set of keys for selectively energizing a certain group of said selecting magnets to punch in one of said decks, a second set of keys for selectively energizing a different group of said selecting magnets to punch in the other of said decks, means jointly controlled by said keys for rendering said punch operating means effective only upon operation of said keys for punching said given item of data in both decks.

8. In a punching mechanism, two sets of crossbars arranged in parallel planes with the first set of said bars in one plane extending in a direction transverse to the second set of bars in the other plane, a slidable supporting frame for said first set of bars, a drive shaft, means for eccentrically coupling said shaft to said frame, means for rotatably positioning said shaft to thereby through said eccentric coupling selectively position said first set of bars in at least one of three different and distinct positions, means for selectively shifting the bars of the second set out of their plane and into engagement with the bars of the first set, each shiftable bar being configured to engage a different combination of bars of the first set for each different selective position of said first set, a plurality of punch selecting devices, there being one of said devices for each bar of said first set, and means controlled by said first set of bars for operating the related punch device when engaged by a bar of said second set.

9. In a punching mechanism, two sets of crossbars arranged in parallel planes with the first set of said bars in one plane extending in a direction transverse to the second set of bars in the other plane, a supporting frame means for said first set of bars, a spring biased drive shaft, an eccentric connection between said frame and shaft, means for rotatably positioning said shaft for selectively positioning said first set of bars in its plane and in the direction of said second set of bars, means for selectively shifting the bars of the second set out of their plane and into engagement with the bars of the first set, each shiftable bar being configured to engage a different combination of bars of the first set for each different selective position of said first set, a plurality of punch selecting devices, there being one of said devices for each bar of said first set, and means controlled by said first set of bars for operating the related punch device when engaged by a bar of said second set.

10. A keyboard such as in claim 1, in which key controlled means is provided for rendering said conditioning circuit ineffective, a further circuit, said further circuit being rendered effective by said key controlled means to energize the punch magnet in response to the energization of all interposer magnets taken in any combination of selectivity within the range of said elements.

11. In combination, a plurality of punch selecting magnets, punching means, card feeding means, a key, circuit connections between said key and magnets for causing energization of a predetermined combination of magnets upon operation of said key, means effective upon completion of said energization for operating said punching and feeding means to punch in one card column, automatic means effective upon completion of the operation of said punching and feeding means for energizing a different predetermined combination of magnets to effect further punching and feeding to punch in a second card column, control mechanism provided for said automatic means to cause the same to alternately energize said magnets in accordance with the first and second named combinations to punch subsequent alternate columns in a like manner, and means controlled by the card feeding means for terminating said automatic punching.

12. In a machine of the class described, a plurality of punch selecting magnets greater in number than a first predetermined amount and each having associated therewith a set of shiftable contacts with each set representing unity, means for selectively shifting said sets of contacts, circuit connections interconnecting said contacts in accordance with a table of addition, a punch, a punch operating magnet, selectively settable means for causing said circuit connections to interconnect said contacts in accordance with a table of addition for a sum represented by said first predetermined amount, or a second predetermined amount or a third predetermined amount, and means for energizing said punch operating magnet only when the sum of the shifted sets of contacts equals a predetermined amount as determined by said selectively settable means.

References Cited in the file of this patent
UNITED STATES PATENTS

| Number | Name | Date |
| --- | --- | --- |
| Re. 22,394 | Moore et al. | Nov. 23, 1943 |
| 1,988,943 | Griffith | Jan. 22, 1935 |
| 2,027,917 | Lasker | Jan. 14, 1936 |
| 2,044,707 | Lasker | June 16, 1936 |
| 2,124,178 | Lasker | July 19, 1938 |
| 2,394,604 | Ford | Feb. 12, 1946 |
| 2,558,476 | Carpenter et al. | June 26, 1951 |
| 2,559,637 | Kirchel | July 10, 1951 |
| 2,581,184 | Goff | Jan. 1, 1952 |
| 2,614,632 | Closs | Oct. 21, 1952 |